US006280120B1

(12) United States Patent
Okamoto et al.

(10) Patent No.: US 6,280,120 B1
(45) Date of Patent: Aug. 28, 2001

(54) ADHESION PREVENTING METHOD AND SUPPORT BODY EXTRACTING METHOD

(75) Inventors: Kouichi Okamoto, Osaka; Yoshihiko Masuda, Takarazuka; Kenji Kadonaga, Takatsuki; Yohei Murakami, Suita; Akira Hattori, Kobe, all of (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 09/327,591

(22) Filed: Jun. 8, 1999

(30) Foreign Application Priority Data

Jul. 27, 1998 (JP) ........................................ 10-211240

(51) Int. Cl.$^{7}$ .......................... E02D 11/00; E02D 5/20; B32B 9/04

(52) U.S. Cl. ...................... 405/232; 405/257; 428/411.1

(58) Field of Search .............................. 405/232, 233, 405/244, 257; 428/357, 411.1

(56) References Cited

U.S. PATENT DOCUMENTS

| | | | |
|---|---|---|---|
| 5,236,975 | 8/1993 | Sekine | 523/510 |
| 5,356,241 | * 10/1994 | Kunito | 405/233 |

FOREIGN PATENT DOCUMENTS

| | | |
|---|---|---|
| 0 663 477 A1 | 7/1995 | (EP) . |
| 59-78809 | 5/1984 | (JP) . |
| 60-242218 | 12/1985 | (JP) . |
| 61-290118 | 12/1986 | (JP) . |
| 62-41819 | 2/1987 | (JP) . |
| 62-41820 | 2/1987 | (JP) . |
| 62-174418 | 7/1987 | (JP) . |
| 63-165615 | 7/1988 | (JP) . |
| 64-58715 | 3/1989 | (JP) . |
| 6-185054 | 7/1994 | (JP) . |
| 6-63634 | 9/1994 | (JP) . |
| 9-31983 | 2/1997 | (JP) . |
| 9-39147 | 2/1997 | (JP) . |

* cited by examiner

*Primary Examiner*—William Neuder
*Assistant Examiner*—Jennifer R. Dougherty
(74) *Attorney, Agent, or Firm*—David G. Conlin; Dike, Bronstein, Roberts & Cushman Intellectual Property Group

(57) ABSTRACT

To prevent adhesion of a support body and a hardened body of a hydraulic composition, the hydraulic composition being used for a soil structure such as a retaining wall built in a soil excavating work in the civil engineering and construction fields, a composition (A) composed of at least an alkaline-water-soluble resin with an acid value of not less than 15 mgKOH/g and a water-absorbent material is provided so as to intervene between the support body and the hardened body of the hydraulic composition, either by applying the composition (A) on a surface of the support body, or by covering the support body with a sheet-like member on which the composition (A) is applied. The alkaline-water-soluble resin dissolves in alkaline water upon contact with the same contained in the hydraulic composition. As the alkaline-water-soluble resin dissolves, the water-absorbent material swells absorbing the alkaline water, whereby a layer of the water-absorbent material which has swollen is formed between the hardened body of the hydraulic composition and the support body, preventing the adhesion therebetween.

23 Claims, 9 Drawing Sheets

ADHESION PREVENTING METHOD AND SUPPORT BODY EXTRACTING METHOD

FIELD OF THE INVENTION

The present invention relates to a method for preventing adhesion of a hardened body of a hydraulic composition and a support body, the support body being intended to support the hydraulic composition from inside or outside the same at least while the hydraulic composition is being hardened, as well as related to a method for extracting a support body out of the hydraulic composition after the hydraulic composition is hardened, the support body being intended to support the hardened hydraulic composition from inside the same at least while the hydraulic composition is being hardened, the hydraulic composition being used for soil structure which is built in foundation constructing works in the civil engineering and construction fields. More specifically, the present invention relates to a method for suppressing adhesion between a support body and a hardened body of a hydraulic composition, and a method for extracting the support body therefrom, the methods being characterized in that a composition composed of at least an alkaline-water-soluble resin with an acid valve of not less than 15 mgKOH/g and an absorbent is used, to suppress adhesion between a support body such as H-shaped steel and a hardened body of a hydraulic composition such as a cement composition and to more easily separate the both from each other.

BACKGROUND OF THE INVENTION

In the fields of civil engineering and construction, in order to build a soil structure to be used as a structure like a retaining wall which is built in a foundation constructing work, (i) an H-shaped steel or the like, which is to serve as a support body (core) for supporting from inside a hardened body of a hydraulic composition formed by hardening the hydraulic composition such as cement milk or freshly mixed concrete, is preparatorily loosely inserted into a bore hole and the hydraulic composition such as cement milk or freshly mixed concrete is poured to around the H-shaped steel so as to be hardened (hydrated), or alternatively (ii) an H-shaped steel or the like as core is buried (driven) into a hydraulic composition which has been poured into a bore hole and thereafter the hydraulic composition is hardened (hydrated).

Examples of such building techniques include a peristylar soil cement continuous wall technique which is recently generally used for civil engineering works and construction works for high-rise building construction and such works in river and underground areas. In this technique, areas surrounding a construction site are bored and holes obtained by the boring are filled with a cement composition such as a soil cement milk so that soil cement walls for suppressing hydraulic pressure and earth pressure are constructed, in which H-shaped steels, for example, are used as cores. In earth retaining works as well, support bodies (cores) such as H-shaped steels are buried in a cement-based substance so as to form concrete walls.

Support bodies such as H-shaped steels thus buried in hydraulic compositions are in many cases unnecessary after finishing of the construction, and if the support bodies unnecessary are extracted from the hardened bodies of the hydraulic composition and collected so as to be re-used, it will be of advantage, from the viewpoints of saving of resource and environmental safeguards, and also will be very economical. Further, by extracting from the hardened bodies of hydraulic composition the support bodies which have become unnecessary after foundation constructing works finished, or separating portions of the hardened bodies in contact with the support bodies from the support bodies or removing the same therefrom, it will facilitate such secondary works as the expansion and the remodeling of existing buildings and the construction of sewerage systems and water supply systems.

Therefore, the support bodies such as H-shaped steels buried in the hydraulic composition are preferably extracted from the hardened bodies (hydrates) after the hardening of the hydraulic composition so as to be re-used, or are preferably extracted from the hardened bodies and removed, or made separable therefrom, so that they will not later obstruct redevelopment of the underground of the same site.

The support bodies (cores) thus buried and the hardened bodies of the hydraulic composition firmly bond with each other, and in order to separate the support bodies from the hardened bodies of the hydraulic composition and extract them, such a considerably great pulling force that may overwhelm bond strength (adhesive strength) is required (in many cases, extraction is impossible), resulting in that extra equipments, costs, and time for the separation are needed. As a result, the workability is inferior, a work of removal cannot be swiftly carried out. In addition, -:he support bodies (cores) such as H-shaped steels extracted out are consequently deformed, which are inappropriate for re-use.

Therefore, various methods for facilitating the foregoing extracting works have been conventionally proposed, which include (i) a method in which a lubricant such as wax or grease is preparatorily applied on a surface of an H-shaped steel, a method in which a water-absorbent resin is applied onto a surface of an H-shaped steel with use of an adhesive, (ii) a method in which a lubricating material is bonded on a surface of an H-shaped steel, and (iii) a method in which an H-shaped steel is covered with a covering member.

As the method of the above (i), the Japanese Publication for Laid-Open Patent Application No. 58715/1989 (Tokukaisho 64-58715 (date of publication: Mar. 6, 1989)) proposes that a surface processing agent for core-extraction use, which is made of a water-absorbent resin and a spreading agent such as a polyester-based resin, a vinyl-based resin, an acryl-based resin, or an urethane-based resin is used rather than the foregoing lubricant. The Japanese Publication for Laid-Open Patent Application No. 165615/1988 (Tokukaisho 63-165615 (date of publication: Jul. 8, 1988)) proposes a method in which a water-swelling film made of a water-absorbent resin and a volatile-film-forming resin such as natural rubber, synthetic rubber, or plastic is used, rather than the foregoing lubricant, so that frictional resistance upon extraction of a steel stock is reduced.

Furthermore, as the method of the above (ii), the Japanese Publication for Laid-Open Patent Application No. 185054/1994 (Tokukaihei 6-185054 (date of publication: Jul. 5, 1994)) proposes application of a sheet-like lubricating material made of superabsorptive fibers onto a surface of a steel stock. Further, for example, the Japanese Publication for Laid-Open Patent Publication No. 174418/1987 (Tokukaisho 62-174418 (date of publication: Jul. 31, 1987)) proposes that a lubricating tape made of a water-absorbent resin and a binder is used so that frictive resistance upon extraction of steel stocks is reduced.

Furthermore, as the method of the above (iii), the Japanese Publication for Laid-Open Patent Application No. 247549/1995 (Tokukaihei 7-247549 (date of publication: Sep. 26, 1995), corresponding to the European Patent Application No. 0663477A1 (date of publication: Jul. 19, 1995))

discloses a method in which a temporarily buried reinforcement is covered with a bag-shaped lubricating member composed of a polymer sheet which is produced by bonding a water-absorbent resin directly onto a substrate such as woven fabric or non-woven fabric without use of a bonding agent, so that frictive resistance upon extraction of the buried reinforcement is reduced.

However, the spreading agent contained in the surface processing agent which is proposed in the aforementioned Tokukaisho 64-58715, and the volatile-film-forming resin contained in the water-swelling film which is proposed in the aforementioned Tokukaisho 63-165615 are inferior in solubility in cement water contained in a hydraulic composition such as concrete, as well as inferior in swelling with respect to the same. Accordingly, both of the foregoing spreading agent and the foregoing volatile-film-forming resin hinder volume expansion of the water-absorbent resin upon its swelling by absorbing water. Thus, the foregoing surface processing agent and the foregoing water-swelling film have a drawback in that the water-absorbent resin cannot fully exhibit its absorbing property (performance) since the spreading agent and the volatile-film-forming resin thus coat surfaces of the water-absorbent resin, thereby hindering volume expansion of the water-absorbent resin. Furthermore, the water-absorbent resin contained in the conventional surface processing agent and water-swelling film is inferior in swelling by absorbing cement water. Moreover, a coating film obtained by applying the foregoing surface processing agent on a support body such as an H-shaped steel used as core, as well as the water-swelling film, since being inferior in flexibility and tenacity, tend to exfoliate from the support body (core) or become sticky, and to be damaged due to friction during application and construction works. Furthermore, in the case where the surface processing agent is applied to the support body (core) at a site of construction, there is a drawback in that labor, time, place, and the like for heating, melting, and applying the surface processing agent have to be prepared.

Therefore, the foregoing conventional surface processing agent and water-swelling film have drawbacks in that they do not exhibit satisfactory performance, and in that they yield only a poor effect for facilitating the works of extracting the support body (i.e., temporarily buried reinforcement) such as an H-shaped steel which has been buried as core.

Regarding the lubricating material disclosed in Tokukaihei 6-185054 and the lubricating tape disclosed in Tokukaisho 62-174418, since the superabsorptive fiber and the water-absorbent resin therein are inferior in water-absorbing swelling caused by absorption of cement water, the lubricating material and the lubricating tape only insufficiently facilitate the work of extracting the support body (i.e., temporarily buried reinforcement). The foregoing lubricating tape easily dissolves when the binder becomes in contact with water, resulting in that the water-absorbent resin tends to fall off. Furthermore, a surface of a steel stock to be buried is usually soiled with rust and dust, and this hinders the lubricating tape from adhering to the steel stock. Besides, cement water to which the lubricating tape tends to become in contact with, unexpected wetness or precipitation, or the like during this construction work also causes the water-absorbent resin to fall off and become lost. Therefore, the lubricating tape cannot fully exhibit its effect. Furthermore, binder thus dissolving causes steel stocks to easily slip, thereby producing dangerous circumstances in some cases, and further, in the case where steel stocks are piled in the open air, the lubricating tape cannot be applied onto the steel stocks when they are wet due to precipitation or the like. Thus, there are many limitations from the viewpoint of practical application thereof to actual construction works. On the other hand, since the swelling material is in the sheet form made of superabsorptive fiber, it further more easily absorbs water than the foregoing lubricating tape does. Therefore, the lubricating material tends to easily fall off and become lost, and moreover, since a surface of a steel stock to be buried is usually soiled with rust and dust, this hinders the lubricating material from adhering to the steel stock. Accordingly problems like the aforementioned ones arise.

Therefore, satisfactory performance cannot be obtained from any one of the foregoing conventional surface processing agent, water-swelling film, lubricating material, and lubricating tape, and accordingly, only a poor effect is achieved by any one of them for facilitating the work of extracting the support body (temporarily buried reinforcement) used as core out of the hardened body of the hydraulic composition.

Furthermore, the bag-shaped lubricating material disclosed by the aforementioned Tokukaihei 7-247549 is arranged so that the water-absorbent resin is directly and firmly bonded to a substrate without use of a bonding agent (in other words, monomers are made to adhere directly to the substrate, and polymerized on fibers of the substrate so as to be bonded thereto). A material which is soft and whose fiber restriction (entanglement and binding power of fibers) is small is adapted so as to be used as the substrate in the foregoing lubricating material. This is because, in the case where a substrate which is thick and strong is used, productivity of the resultant product (lubricating material) extremely lowers, as well as because, in the case where a substrate whose fiber restriction is great is used, the resultant product (lubricating material) has hard texture and is prone to wrinkles, thereby having lower quality. Accordingly, the product (lubricating material) according to the foregoing publication has lower strength. The conventional bag-shaped lubricating material using the substrate thus having lower strength is possibly damaged by external force which is exerted to the lubricating material at such occasions as when the lubricating material is applied to the support body so as to cover it, or when the support body is buried (driven) into the hydraulic composition poured into bore holes so that the support body serves as core. Thus, in some cases, it is impossible to sufficiently prevent the adhesion of the support body to the cured body of the hydraulic composition.

Therefore sought for is a technique for suppressing adhesion between the support body and the hardened body of the hydraulic composition such as cement composition and easily separating the hardened body and the support body, particularly a technique for extracting the support body buried in the hardened body therefrom in a more easily manner.

Incidentally, techniques currently put in practical application are, since no alternative techniques exist, only a technique in which a lubricant is made to adhere directly to a surface of a support body such as an H-shaped steel, and a technique in which a support body (core) is covered with a polyvinyl chloride sheet with lubricity, in spite of their drawbacks which include a drawback in that effects relating to facilitating the extraction and the construction are poor and a drawback in that sometimes a greater-scale extracting device than prearranged becomes required unexpectedly during an extracting operation.

SUMMARY OF THE INVENTION

The present invention was made( in light of the aforementioned conventional problems, and the object of the present invention is to suppress adhesion between a hardened body of a hydraulic composithon such as cement composition and a support body such as H-shaped steel for supporting the hardened body of the hydraulic composition from inside or outside the same at least while the hydraulic composition is being hardened, so as to improve workability of the work of separation between the hardened body of the hydraulic composition and the support body.

The inventors of the present invention have earnestly studied to achieve the foregoing objects. In result, they found that the adhesion of the support body and the hardened body of the hydraulic composition can be suppressed by providing a layer of a composition (A) composed of at least an alkaline-water-soluble resin with an acid value of 15 mgKOH/g and a water-absorbent material so that the composition (A) layer intervenes between the support body and the hardened body of the hydraulic composition, and thereby it is possible to improve workability of such a work as extraction of the support body from the hardened body of the hydraulic composition, separation of a part of the hardened body of the hydraulic composition from the support body, or separation of the support body from the hardened body of the hydraulic composition. By so doing, they completed the present invention.

More specifically, to achieve the foregoing object, the adhesion preventing method in accordance with the present invention is a method for preventing adhesion of a hardened body of a hydraulic composition and a support body, the support body being intended to support the hardened body of the hydraulic composition from inside or outside the same at least while the hydraulic composition is being hardened, and is characterized by including the step of providing a composition (A) layer so as to intervene between the support body and the hardened body of the hydraulic composition.

In the foregoing method, the alkaline-water-soluble resin starts to dissolve when becoming in contact with alkaline water. In other words, by providing the composition (A) so as to intervene between the support body and the hardened body of the hydraulic composition, the alkaline-water-soluble resin in the composition (A) starts to dissolve when the composition (A) comes into contact with the hydraulic composition, resulting in that a layer of an water-absorbent material which has swollen absorbing water is formed between the hardened body of the hydraulic composition and the support body. In short, since a layer of the water-absorbent material having swollen is formed between the hardened body of the hydraulic composition and the support body, adhesion therebetween can be suppressed. This arrangement makes the foregoing support body of the present invention buried in the hardened body of the hydraulic composition slipperily move upon extraction of the support body therefrom, since the water-absorbent material exhibits the lubricating effect. Therefore, labor (pulling force) during the work of extraction (separation) of the buried support body from the hardened body of the hydraulic composition can be reduced, whereby the workability of the work can be improved. On the other hand, upon detachment of a part of the hardened body of the hydraulic composition from the support body or upon detachment of the support body from the hardened body of the hydraulic composition, labor required for the detachment is reduced since the adhesion therebetween is suppressed by virtue of the layer of the water-absorbent material having swollen absorbing water, whereby workability of the work of separation between the hardened body of the hydraulic composition and the support body can be improved. Furthermore, gaps can be formed between the support body and the hardened body of the hydraulic composition by drying the water-absorbent material up, which further improves the workability of the foregoing works. Further, since the alkaline-water-soluble resin is made to firmly adhere to the support body, loss of the water-absorbent material prior to or before construction work due to unexpected wet or precipitation (including acid rain) can be suppressed.

Moreover, since the foregoing method serves to improve the workability of the work of separation or the like, the work of removal can be swiftly carried out.

As examples of the method of providing the composition (A) so as to intervene between the hardened body of the hydraulic composition and the support body, the following may be cited: a method of applying the composition (A) onto the support body; and a method of wrapping the support body with a covering member such as a sheet-like member on which the composition (A) is applied.

In the case where the support body is wrapped with the sheet-like member on which the composition (A) is applied, the sheet-like member may be formed into a bag or tube shape to which the support body can be inserted.

In the case where the support body is wrapped with the bag-shaped sheet-like member on which the composition (A) is applied, the support body can be wrapped in a simpler and speedier manner. As compared with the case where the sheet-like member is directly bonded onto the support body, the sheet-like member comes into contact with water contained in the hydraulic composition on both sides (internal and external sides) of itself, thereby facilitating formation of a layer for facilitating separation, i.e., the layer of the water-absorbent material, between the support body and the hardened body of the hydraulic composition. Furthermore, since the composition (A) layer is formed on the sheet-like member which is made of, for example, soft woven fabric and to which a solution of the composition (A:) is permeable, the alkaline-water-soluble resin in the composition (A) is made to firmly adhere to the sheet-like substrate. For this reason, loss of the water-absorbent material in the composition (A) from the sheet-like substrate prior to or during construction work can be suppressed.

Furthermore, the water-absorbent material composing the composition (A) is preferably a water-swelling resin. With the foregoing arrangement, the water-swelling resin which have swollen exhibits the lubricating effect, thereby causing the support body to further slipperily move. As a result, the workability of such a work as extraction of the support body from the hardened body of the hydraulic composition, or separation of the support body or the hardened body of the hydraulic composition, can be further improved. In this case, the water-swelling resin is preferably covered with the alkaline-water-soluble resin. With this arrangement, in the case where a covering member, for example, the sheet-like member with the composition (A) layer applied thereon, is occasionally in contact with water due to unexpected wet or precipitation (including acid rain) prior to the work of construction, the covering member is less likely damaged before the work of construction (before use), since the alkaline-water-soluble resin does not easily dissolve in water not exhibiting alkalinity, i.e., neutral or acidic water. In the case where the support body is buried (temporarily buried), it is particularly preferable that the presence of the alkaline-water-soluble resin, at the initial stage, prevents the water-swelling resin from swelling, hence suppressing loss (falling off) of the water-swelling resin, and that thereafter as the alkaline-water-soluble resin dissolves, the water-swelling resin absorbs water contained in the hydraulic composition and swells. For this purpose, it is important to appropriately select the type of the alkaline-water-soluble resin as well as to sufficiently coat the water-swelling resin with the alkaline-water-soluble resin. Furthermore, more preferable as the alkaline-water-soluble resin is an alkaline-water-soluble resin whose glass transition temperature is controllable so that a coating film (resin layer) made of it, formed by applying it to the sheet-like member, does not become sticky and does not have cracks.

To achieve the foregoing object, the support body or the sheet-like member is characterized in that the foregoing composition (A) is applied onto at least a part of the same.

With the foregoing arrangement, a layer of the water-absorbent material which has swollen absorbing water is formed between the hydraulic composition and a surface of the support body. In other words, since a layer of the water-absorbent material which has swollen is formed between surfaces of the hardened body of the hydraulic composition and the support body, the adhesion therebetween can be suppressed. This makes the foregoing support body slipperily move, upon extraction of the support body from the hardened body of the hydraulic composition for example, since the water-absorbent material exhibits the lubricating effect. Therefore, labor (pulling force) in the work of extraction of the support body from the hardened body of the hydraulic composition can be further reduced, whereby the workability of the work can be improved. On the other hand, upon detachment of a part of the hardened body of the hydraulic composition from the support body or upon detachment of the support body from the hardened body of the hydraulic composition, labor required for the detachment is reduced since the adhesion therebetween is suppressed by virtue of the layer of the water-absorbent material having swollen absorbing water. Furthermore, gaps can be formed between the support body and the hardened body of the hydraulic composition by drying the water-absorbent material up, which further improves the workability of the foregoing work. For this reason, the foregoing support body and the sheet-like member are particularly suitably used for formation of such a structure as a retaining wall.

Incidentally, in the case where the support body such as H-shaped steel is stored, it is usually stored outdoor, for example, at a storing site. When, however, it rains, or night dew takes place, or the ground is wet during the storage, in the case where a support body covered with the conventional covering member, for example, a coating film containing a water-absorbent resin or a water-swelling film, the water-absorbent resin contained in the coating film or the water-swelling film absorbs water and swells. In other words, since the water-absorbent resin has swollen prior to construction of a soil structure, the support body has a slippery surface, thereby making the construction work of the soil structure difficult. Furthermore, to prevent the water-absorbent resin from swelling before the construction of a soil structure, the support body has to be piled on a waterproof sheet and wrapped with the same, or stored in an indoor material storing site. Therefore, it is impossible to store the support body in a simple and inexpensive manner.

However, with the foregoing arrangement, in the case where the support body or the sheet-like member with the composition (A) layer formed at least a part of the same, or the support body covered with the foregoing sheet-like member, is occasionally in contact with water due to unexpected wet or precipitation (including acid rain), since the alkaline-water-soluble resin does not easily dissolve in water exhibiting neutrality or acidity, absorption of water by the sheet-like member less likely occurs, thereby less likely causing damage to their performance before the work of construction (before use) or making the work of construction difficult. Therefore, it is even possible to make it unnecessary to cover the support body with a waterproof sheet, to store the same at an indoor material storing site, or the like. Therefore, it is possible to store the support body and the sheet-like member in a simpler and more inexpensive manner.

In this case, if a coat with water resistance with respect to water such as rain exhibiting a pH in a range of neutrality and acidity (hereinafter referred to as waterproof coat) is formed on a surface of the layer of the composition (A), the support body or the sheet-like member having the composition (A) applied to at least a part thereof, or the support body covered with the sheet-like member, when for storage being piled for example at an outdoor material storing site, does not undergo swelling of the water-absorbent material absorbing water of precipitation, night dew, or water from earth. Further, in the case where during the work of construction the support body or the sheet-like member comes into contact with water due to unexpected wet or precipitation (including acid rain), unexpected swelling of the water-absorbent material prior to or during the work of construction can be prevented, since the alkaline-water-soluble resin contained in the composition (A) does not dissolve due to the wet or precipitation, by virtue of the waterproof coat formed on the surface of the composition (A) layer. The foregoing waterproof coat may be formed by application of a water resistance applying agent, for example.

Furthermore, to achieve the foregoing object, the support body extracting method of the present invention, which is a method for extracting a support body buried in a hardened body of the hydraulic composition therefrom, and is characterized by including the steps of (i) preparing the support body which the composition (A) is made to adhere to or which is covered with a sheet-like member which the composition (A) is made to adhere to, (ii) providing a layer of the composition (A) so as to intervene between the support body and the hardened body of the hydraulic composition, by burying the support body prepared through the support body preparing step in the hydraulic composition and letting the hydraulic composition harden, and (iii) extracting the support body from the hardened body of the hydraulic composition.

The foregoing method is suitably applied in the case where a support body (temporarily buried reinforcement), which is buried (or placed) as core in a hardened body of a cement composition (hydraulic composition), is extracted therefrom, the hardened body of the cement composition being used for a soil structure such as a retaining wall, a groundsel (foundation), or a pile, which is constructed in a foundation constructing work of the building construction and civil engineering fields such as construction of a soil cement wall.

More specifically, to achieve the aforementioned object, the support body extracting method is a method for extracting a support body out of a cement composition after the cement composition is hardened, the support body being intended to support the hardened body of the cement composition from inside the same at least while the cement composition is being hardened, the cement composition being used for soil structure which is built in foundation constructing works in the civil engineering and construction fields, and the method preferably includes the steps of (i) pouring the cement composition into a bore hole formed by boring the soil, (ii) preparing the support body by making the composition (A) to adhere to a surface of the support body, or by covering the support body with a sheet-like member on which the composition (A) adheres, (iii) providing a layer of the composition (A) so as to intervene between the support body and the hardened body of the cement composition, by driving the support body prepared through the support body preparing step into the cement composition placed in the bore hole and letting the cement composition harden, and (iv) extracting the support body from the hardened body of the cement composition.

By the foregoing method, a layer of the water-absorbent material which has swollen absorbing water is formed between the hardened body of the cement composition and the support body, whereby the adhesion between the both can be further suppressed. This makes the support body move more slipperily, upon extraction of the support body from the hardened body of the cement composition, since the water-absorbent material having swollen exhibits a lubricating effect. Therefore, labor (pulling force) in the work of extraction of the support body from the hardened body of the cement composition can be reduced, whereby the workability of the work can be improved. Further, since the alkaline-water-soluble resin is made to firmly adhere to the sheet-like substrate, loss of the water-absorbent material prior to or before construction work due to unexpected wet or precipitation (including acid rain) can be suppressed.

The foregoing effect is particularly remarkable in the case where the same support body is driven a plurality of times into the cement composition (reinsertion of support body is conducted), and leads to an excellent advantage of not impairing extractability of the support body.

Furthermore, by the foregoing method, it is possible to improve the workability of the work of extraction of the support body from the hardened body of the cement composition, or the workability of the work of separation between the hardened body of the cement composition and the support body which is destined to be in contact with the hydraulic composition before hardening and to be separated from the hardened body of the hydraulic composition after hardening. Therefore, the work of construction can be swiftly promoted.

For a fuller understanding of the nature, the advantages, and the other objects of the invention, reference should be made to the ensuing detailed description taken in conjunction with the accompanying drawings.

BRIEF DESCRIPTION OF THE DRAWINGS

FIG. 9(*b*) is an explanatory view illustrating a state of the buried-reinforcement-extraction-use equipment when it is attached to the support body.

DESCRIPTION OF THE PREFERRED EMBODIMENTS

Figure 1:
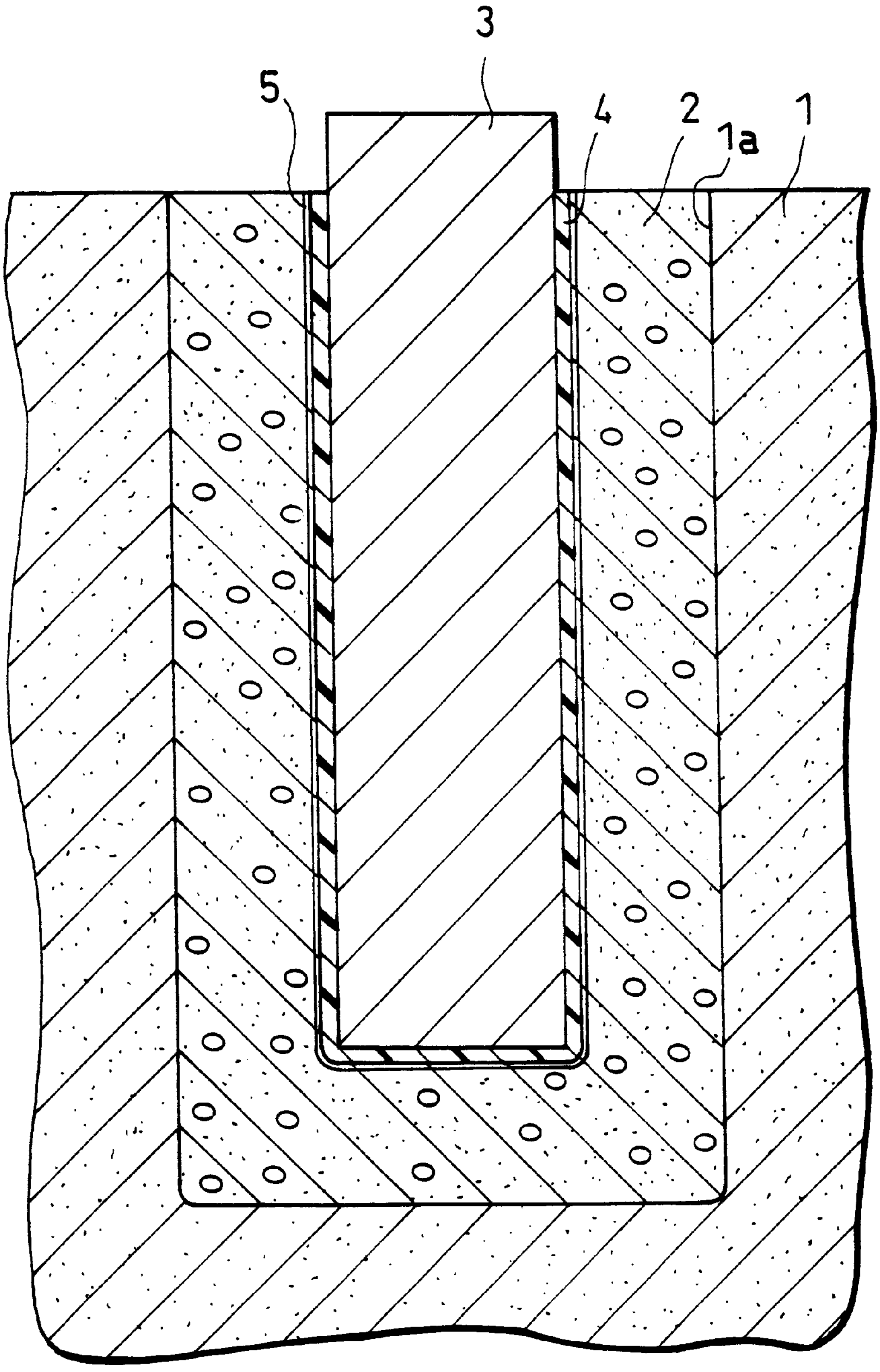
FIG. 1 is a cross-sectional view illustrating a schematic arrangement of a soil structure in accordance with an embodiment of the present invention.

A composition (A) in the present invention is a composition composed of at least a resin which has an acid value of not less than 15 mgKOH/g and is soluble in an alkaline water, and a water-absorbent material. The composition (A), in application, intervenes between a support body and a hardened body of a hydraulic composition, the support body being a body for supporting the hardened body of the hydraulic composition, at least when the hydraulic composition is hardening, from inside or outside the hardened body (in other words, being a body for supporting a structure obtained by hardening the hydraulic composition, at least when the structure is being formed, from inside or outside the structure).

The foregoing structure of the present invention is a structure which is composed of at least a hardened body of a hydraulic composition and which is obtained by hardening a hydraulic composition, and as typical examples of the same, a soil structure such as a retaining wall, a groundsel (foundation), and a pile, constructed in a work of underground construction in the fields of civil engineering and construction, may be cited. The structure may be (i) a hardened body of a hydraulic composition which is finally obtained after extracting the support body out of the hardened body, (ii) a structure composed of the hardened body of the hydraulic composition and the support body, the support body being at least partly in contact with the hardened body on an internal or external side of the hardened body so that the support body supports the hardened body of the hydraulic composition from inside or outside the hardened body, or (iii) the foregoing structure optionally further including other components.

As typical examples of the hardened body of a hydraulic composition constituting the foregoing structure, soil cement (hardened mixture of soil, cement, and water), various types of concrete (obtained by incorporating cement, water, fine aggregate, coarse aggregate, and admixtures optionally added), and various types of mortar (obtained by incorporating cement, water, fine aggregate, and admixtures optionally added) may be cited, though the hardened bodies are not particularly limited.

Cited as typical examples of the hydraulic composition are hydraulic compositions commonly used in such foundation constructing works in building construction and civil engineering fields in that soil structures including retaining walls, groundsels (foundation), piles and the like are constructed. In other works, the hydraulic composition of the present invention contains, for example, water and a material such as cement, which is hardened with use of water. More specifically, the hydraulic composition is a cement composition which contains, for example, water and cement such as Portland cement or mixed cement, as well as aggregates such as sand and gravel, cement-admixture, chemical admixture, reinforcement material and the like which are optionally added. The hydraulic composition is gradually hydrated (hardened) as cement and water are blended and kneaded, finally becoming a hydrate (hardened body). Water thus incorporated is gradually consumed during hydration. Note that types of cement, aggregate, admixture, chemical admixture, reinforcement material, and the like and combinations thereof, contained in the hydraulic composition, that is, compositions of the hydraulic composition, are not particularly limited.

The foregoing support body adapted in the present invention is used in formation of the foregoing structure, so as to support the hardened body of the hydraulic composition, at least when the hydraulic composition is hardening, from inside or outside the hardened body. More specifically, the support body is (i) a core (temporarily buried reinforcement, or buried reinforcement) which supports a hardened body of a hydraulic composition from the inside of the hardened body when the hydraulic composition is hardening and if necessary continuously after the hardening of the same, the support body being buried in the hydraulic composition as core so as to constitute a part of structure such as a retaining wall, a groundsel (foundation), or a pile that is obtained by hardening the hydraulic composition, sometimes only until the core is finally extracted from the same as required, or (ii) a matter (support body) which is at least partly in contact with a hydraulic composition, and supports a hardened body of the hydraulic composition from outside the hardened body at least when the hydraulic composition is hardening.

As concrete examples of the support body, a column-like support body, a cylindrical-shaped column-like support body, and a plate-like support body may be cited. In more concrete terms, the column-like support body is, for example, an H-shaped steel, a steel I pile, a steel prop, a concrete pile, a pole, or the like: the cylinder-type column-like support body is, for example, a cylindrical-shaped pile (hollow pile) or the like; the plate-like support body is, for example, a steel sheet piling (sheet pile) or a corrugated sheet which is long-plate-like support body, or the like.

In other words, examples of the support bodies include, not only a buried reinforcement, or a temporarily buried reinforcement to be finally extracted, which is adapted so as to be used as core of a hardened body of a hydraulic composition, but also a support body which functions as mold for keeping hydraulic composition in a desired shape until the hardening of the hydraulic composition is completed or functions as retaining wall. Thus, the support body refers to all matters each of which is at least partly in contact with an unhardened hydraulic composition so as to support the hardened body of the hydraulic composition at least while the hydraulic composition is hardening, from inside or outside the hardened body of the hydraulic composition, and is arranged so that at least a part of a portion thereof in contact with the hardened body of the hydraulic composition is separated from the hardened body of the hydraulic composition after completion of the hardening of the hydraulic composition.

A material used for forming the (support body may be selected according to intended use of the same and strength required of the same, and the support body may be made of steel, plastic, concrete, wood, or the like. The material, however, is not particularly limited.

In the present invention, the foregoing "buried reinforcement" refers to a reinforcement buried in a hydraulic composition, and therefore, it does not follow that only a matter to be buried in soil foundation is referred to. Furthermore, the "temporarily buried reinforcement" has no particular restriction except that it is a buried reinforcement which is buried on the premise that it is extracted after usage or when it becomes unnecessary or which is buried but preferably extracted at some time thereafter. The "buried reinforcement" and "temporarily buried reinforcement" are hereinafter generally referred to as buried reinforcement. Therefore, the structure formed by using the support body and the hardened body (hydrate) of a hydraulic composition is not limited to a soil structure. The "buried reinforcement" in the present invention is not necessarily completely buried in the hydraulic composition, but may be at least partly buried in the hydraulic composition. Furthermore, the "buried reinforcement" in the present invention also refer to a reinforcing member in a state of being stored in a material storing site or the like before being subject to construction of the structure. Therefore, the category of the "buried reinforcement" in the present invention includes a reinforcement in a state before being buried upon construction of the structure, a buried reinforcement composing the structure, and a reinforcing member extracted from the structure.

As examples of the method for providing the aforementioned composition (A) so as to intervene between the hardened body of the hydraulic composition and the support body, the following method may be cited: the composition (A) is made to adhere on the support body, or the support body is covered with sheet-like member to which the composition (A) is made to adhere, before the support body is buried in the hydraulic composition. As typical examples of the method for burying the support body into the hydraulic composition, a method in which the support body is buried (driven) as core into the hydraulic composition, and a method in which the support body is inserted into a bore hole and thereafter the hydraulic composition is poured into around the support body, may be cited.

The sheet-like member (sheet-like substrate) constituting the foregoing covering member (sheet-like flexible member) has no particular restriction except that it has strength enough to resist various external forces exerted thereto upon construction of the soil structure, such as (i) a pulling force or a sheering force generated by weights of the support body and the hydraulic composition; and, (ii) an impact force or a pulling force, and a force of friction between the foregoing covering member and the hydraulic composition, generated when the support body is buried. In other words, the sheet-like member may be made of any material with a strength such that the sheet-like member is not damaged by such an external force as described above.

In more concrete terms, the sheet-like substrate may be made of:

- non-woven fabric such as split fiber non-woven fabric (for example, "WARIFU" (Japanese trade name)), carpet, felt, asbestos cloth, asbestos felt, glass fiber non-woven fabric, fiber-glass reinforced plastic, stitch bond non-woven fabric, or needle punched non-woven fabric;
- fabric such as fiber fabric of flat yarn, cotton fabric, linen fabric, ribbon-form fabric, belting, or fabric made of synthetic resin like polypropylene,
- blended yarn fabric such as fabric obtained by blending polyester fiber and cotton fiber;
- foamed material obtained by forming closed cells or open cells in such a material as polystyrene, polyethylene, polypropylene, vinyl chloride resin, urethan resin, phenol resin, or rubber foam;
- sheet such as (i) elastomer sheet made of urethan rubber, silicone rubber, fluoro-rubber, ether rubber, acrylic rubber, butyl rubber, neoprene (chloroprene rubber), butadiene-acrylonitrile copolymer, or natural rubber, (ii) plastic sheet made of polyethylene, polypropylene, polyethylene terephthalate, polyamide (nylon), vinyl chloride resin, or acrylic resin, (iii) natural-material sheet such as leather sheet, wood sheet, waterproofed paper sheet, or thick-paper sheet, (iv) metal sheet made of aluminum, iron, copper, silver, or the like, (v) metal alloy sheet made of stainless steel or the like, (vi) stainless steel fiber sheet, (vii) ceramic fiber sheet, (viii) metal foil made of aluminum, iron, copper, silver, or the like, or (ix) metal alloy foil made of stainless steel or the like; or net or mesh such as (i) net or mesh made of polyethylene, polypropylene, polyethylene terephthalate, polyamide (nylon), vinyl chloride resin, acrylic resin, or the like (ii) net or mesh made of aluminum, iron, copper, silver, or the like, or (iii) net or mesh made of metal alloy such as stainless steel.

One of these materials may be used, or alternatively, not less than two selected therefrom may be used in combination (may be compounded).

Among the above-cited materials, split fiber non-woven fabric, needle punched non-woven fabric, fiber fabric of flat yarn, cotton fabric, linen fabric, ribbon-form fabric, fabric made of synthetic resin, and blended yarn fabric are particularly preferable.

Furthermore, among the foregoing materials, with respect to those without water permeability such as the foregoing sheets, slits or pores may be formed as required. In this case, shapes, sizes, number, and positions of the slits or pores are not particularly limited, and they may be appropriately set in ranges such that the sheet-like substrate is allowed to keep a strength which ensures that the material is not damaged when the aforementioned external force is exerted thereto.

The thickness of the foregoing sheet-like substrate may be determined according to the material used, and is not particularly limited, although it is preferably in a range of 0.01 mm to 10 mm, more preferably in a range of 0.05 mm to 8 mm, and particularly preferably in a range of 0.2 mm to 5 mm. In the case where the thickness of the sheet-like substrate is greater than 10 mm, the flexibility of the covering member might possibly be impaired. Besides, since the covering member becomes bulkier, the handling and storage properties of the same might possibly become impaired. In the case where the thickness of the sheet-like member is smaller than 0.01 mm, it might possibly be incapable of maintaining strength enough to resist the external forces.

Incidentally, the basis weight of the sheet-like substrate may be determined according to the material and thickness of the sheet, and is not particularly limited, although the basis weight thereof is preferably in a range of 10 $g/m^2$ to 10,000 $g/m^2$, and more preferably in a range of 20 $g/m^2$ to 1,000 $g/m^2$.

The tensile strength of the sheet-like substrate is not particularly limited, but it is preferably not less than 1 kgf/2.5 cm, more preferably not less than 10 kgf/2.5 cm, and particularly preferably not less than 30 kgf/2.5 cm. In the case where the tensile strength is not less than 1 kgf/2.5 cm, the sheet-like substrate is capable of maintaining a strength enough to make sure that the substrate is not damaged upon exertion of the foregoing external forces. Therefore, it is possible to provide a covering member with a strength enough to ensure that, in the case where they are buried in the hydraulic composition, the covering member is not damaged by an impact force or a pulling force which may be exerted thereto when the support bodies are buried. By contrast, in the case where the tensile strength of the sheet-like substrate is less than 1 kgf/2.5 cm, the material may be easily torn or split upon exertion of an external force.

The tensile strength was measured in the following manner. The sheet-like substrate was cut into 2.5 cm by 20 cm, and the test piece (the sheet-like substrate) thus formed was soaked into an ion exchanged water for 30 minutes so as to be sufficiently wet. The tensile strength of the test piece was measured using a low-speed extension tensile tester according to a tensile test method (tensile strength) of JIS L 1096 (common fabric test method), under the conditions of an elastic stress rate of 20 mm/min, and a free length of test piece between grip of 10 cm. A greater measured value (unit: kgf/2.5 cm) is indicative of a greater tensile strength of the sheet-like substrate.

The sheet-like substrate, that is, the covering member may be formed to a shape appropriate and a size large enough to cover the support body, but as described later, it is preferably fabricated in the shape of a bag or a tube into which the support body can be inserted. By fabricating the sheet-like substrate (i.e., the covering member) into the shape of a bag or a tube, it enjoys a further improvement in workability at the site of work as evinced by the fact that the disposition thereof on a large and heavy reinforcement such as the H-shaped steel is accomplished in a further easier and speedier manner.

In the present invention, the resin soluble in an alkaline water (hereinafter referred to as alkaline-water-soluble resin), which constitutes the composition (A) , i.e., the alkaline-water-soluble resin used together with the water-absorbent material in the present invention, has a function so as to serve as a binder which makes the water-absorbent material to adhere (cement) to the support body or the sheet-like substrate covering the support body. The alkaline-water-soluble resin is used as alkaline-water-soluble binder.

The alkaline-water-soluble resin has no particular limitation except that it has an acid value of not less than 15 mgKOH/g, and that it is soluble in alkaline water obtained by dissolving sodium hydroxide into ion exchanged water at a rate of 0.4 percent by weight (wt %) while it is not soluble in deionized water. The alkaline-water-soluble resin is soluble in cement water contained in such a hydraulic composition as concrete or mortar, but is not soluble in neutral or acidic water. Therefore, the alkaline-water-soluble resin, in the case where the composition (A) intervenes between the support body and the hardened body of the hydraulic composition, starts to dissolve when the composition (A) becomes in contact with the hydraulic composition. In other words, by providing the composition (A) so as to intervene between the support body and the hardened body of the hydraulic composition, the alkaline-water-soluble resin composing the composition (A) starts to dissolve when the composition (A) is brought into contact with the hydraulic composition, resulting in that a layer of an water-absorbent material which has swollen absorbing water is formed between the hardened body of the hydraulic composition and the support body.

Incidentally, the alkaline-water-soluble resin is itself dispersed (dissolved) in the hydraulic composition, thereby forming an easily exfoliated layer between the hardened body of the hydraulic composition and the support body. Therefore, labor in the work of separation between the support body and the hardened body of the hydraulic composition can be reduced.

Furthermore, as will be described later, in the case where a waterproof coat is formed on a surface of the composition (A) layer made of the composition (A) (for example, a coating layer (coating film) formed by applying the composition (A) on the support body or the sheet-like substrate covering the support body), the alkaline-water-soluble resin is used as an agent to give water resistance (hereinafter referred to as water resistance applying agent).

As the alkaline-water-soluble resin, a resin having such a substituent group as a carboxylic group, a sulfonic acid group, or a phosphoric group is preferable. A resin which is obtained by copolymerization of an α,β-unsaturated carboxylic acid-based monomer and a vinyl-based monomer is particularly preferable, since (i) it excels in solubility in an alkaline water as well as enjoys outstanding economy, (ii) use of the same makes the composition (A) layer (coating film) formed by causing the composition (A) to adhere on the support body (for example, by coating) or the sheet-like substrate excel in various physical properties, and besides (iii) the carboxylic group in the α,β-unsaturated carboxylic acid-based monomer has close interaction with various materials, thereby making the obtained coating film excel in adhesion to the support body or the sheet-like member.

The following may be cited as concrete examples of the α,β-unsaturated carboxylic acid-based monomer, though the monomer is not strictly limited to these: α,β-unsaturated monocarboxylic acid such as acrylic acid or methacrylic acid; α,β-unsaturated dicarboxylic acid such as itaconic acid, maleic acid, or fumaric acid; α,β-unsaturated dicarboxylic anhydride such as maleic anhydride or itaconic anhydride, α,β-unsaturated dicarboxylic monoester such as maleic monoester, fumaric monoester, or itaconic monoester. One of the foregoing α,β-unsaturated carboxylic acid-based monomers may be used alone, or not less than two of them may be used in combination. Among the foregoing α,β-unsaturated carboxylic acid-based monomers, acrylic acid and methacrylic acid are preferable sinc(s use of either of the same makes the composition (A) layer (coating film), formed by causing the composition (A) to adhere to the support body or the sheet-like substrate, excel in flexibility and tenacity.

The following may be cited as concrete examples of vinyl-based monomer used as the component copolymerized with the α,β-unsaturated carboxylic acid-based monomer, though the vinyl-based monomer is not limited to these: ester of monohydric alcohol with 1 to 18 carbon atoms and (meth)acrylic acid, such as methyl acrylate, ethyl acrylate, propyl acrylate, butyl acrylate, stearyl acrylate, methyl methacrylate, ethyl methacrylate, propyl methacrylate, butyl methacrylate, or stearyl methacrylate; nitrile group-containing vinyl-based monomer, such as acrylonitrile, or methacrylonitrile; amide group-containing vinyl-based monomer, such as acrylamide, or methacrylamide; hydroxyl group-containing vinyl-based monomer, such as hydroxyethyl acrylate, or hydroxypropyl methacrylate; epoxy group-containing vinyl-based monomer such as glycidyl methacrylate; metallic salt of the α,β-unsaturated carboxylic acid, such as zinc acrylate or zinc methacrylate; aromatic vinyl-based monomer such as styrene or α-methyl styrene; aliphatic vinyl-based monomer such as vinyl acetate; halogen group-containing vinyl-based monomer, such as vinyl chloride, vinyl bromide, vinyl iodide, or vinylidene chloride; aryl ethers; derivative of maleic acid, such as maleic anhydride, maleic monoalkylate, or maleic dialkylate; derivative of fumaric acid, such as fumaric monoalkylate, or fumaric dialkylate; derivative of maleimide, such as maleimide, N-methyl maleimide, N-stearyl maleimide, N-phenyl maleimide, or N-cyclohexyl maleimide; derivative of itaconic acid, such as itaconic moncalkylate, itaconic dialkylate, itaconamides, itaconimides, or esters of itaconamides; alkene such as ethylene or propylene; and diene such as butadiene or isoprene. One of the foregoing vinyl-based monomers may be used alone, or not less than two of them may be used in combination.

Of the foregoing vinyl-based monomers, alkyl acrylates and alkyl methacrylates are preferable since use of the same makes the composition (A) layer (coating film), formed by applying (causing adhesion of) the composition (A) to the support body or the sheet-like substrate, excel in flexibility, adhesion to the support body or the sheet-like substrate, weathering resistance, and tenacity. Moreover, to making the proportion of alkyl (meth)acrylate in vinyl-based monomer not less than 30 wt % is preferable, since it leads to further improvement of flexibility, adhesion to the support body or the sheet-like substrate, weathering resistance, and tenacy of the composition (A) layer (coating film). Alkyl acrylate is most preferably an ester of monohydric alcohol with 1 to 18 carbon atoms and (meth)acrylic acid, since in this case the flexibility, adhesion to the support body or the sheet-like substrate, weathering resistance, and tenacy of the composition (A) layer (coating film) particularly improve. Furthermore, an ester of monohydric alcohol with 1 to 4 carbon atoms and (meth)acrylic acid is particularly preferable, since in this case the use of the same allows an obtained alkaline-water-soluble resin to be more easily hydrolyzed, thereby further excelling in solubility in an alkaline water.

Furthermore, a proportion of the α,β-unsaturated carboxylic acid-based monomer in the total amount of the α,β-unsaturated carboxylic acid-based monomer and the vinyl-based monomer is preferably not less than 9 wt %, and more preferably in a range of 9 wt % to 40 wt %. By setting the proportion of the α,β-unsaturated carboxylic acid-based monomer to not less than 9 wt %, an alkaline-water-soluble resin further excelling in solubility in alkaline water can be obtained. Furthermore, by setting the proportion of the α,β-unsaturated carboxylic acid-based monomer in the range of 9 wt % to 40 wt %, an alkaline-water-soluble resin particularly excelling in solubility in an alkaline water as well as exhibiting resistance against neutral or acidic water can be obtained.

By copolymerizing such α,β-unsaturated carboxylic acid-based monomer and vinyl-based monomer as described above, an alkaline-water-soluble resin can be obtained. A copolymerizing method, that is, a method for producing the alkaline-water-soluble resin is not particularly limited, but the solution polymerization method is preferable, since the method makes it easy to produce an application solution (fluid dispersion) to be used for forming the composition (A) layer on the support body or the sheet-like substrate so as to function as the adhesion preventive layer (surface processing agent layer). Furthermore, a mean molecular weight of the alkaline-water-soluble resin may be determined according to the composition of the hydraulic composition, pH of the alkaline water, working environment conditions, and the like, and are not particularly limited. However, the mean molecular weight of the same is preferably in a range of 40,000 to 200,000, since in this case a tougher composition (A) layer (coating film) can be obtained and the resultant layer has an appropriate rate of solution with respect to alkaline water. Since the alkaline-water-soluble resin excels in solubility in alkaline water, there is no possibility that the resin hinders swelling of the water-absorbent material when it swells absorbing water. Therefore, the water-absorbent material can fully exhibit the water absorbing property (performance).

The acid value of the alkaline-water-soluble resin in the present invention may be not lees than 15 mgKOH/g, but preferably not less than 30 mgKOH/g, more preferably not less than 50 mgKOH/g, particularly preferably not less than 70 mgKOH/g, and most preferably in a range of 70 mgKOH/g to 500 mgKOH/g. In the case where the acid value of the alkaline-water-soluble resin is less than 15 mgKOH/g, the resin becomes poor in solubility in an alkaline water, resulting in that use of the same makes difficult the work of extracting a buried reinforcement (i.e., a support body or that covered with a covering member), or detaching a part of the hardened body of the hydraulic composition from a support body buried in the hardened body of the hydraulic composition, or detaching a support body (i.e., a support body or that covered with the covering member) from the hardened body of the hydraulic composition. Furthermore, in the case where the acid value of the alkaline-water-soluble resin exceeds 500 mgKOH/g, the water resistance of the resin deteriorates, resulting in that it becomes possible that upon contact with water with a pH level in a range of neutrality and acidity such as precipitation, the composition (A) layer (coating film) formed by causing the composition (A) to adhere to the support body or the sheet-like substrate (by coating), that is, a resin layer, dissolves or swells, thereby becoming damaged. This may possibly trouble the work of fitting to the support body the covering member such as the sheet-like substrate with the composition (A) adhering thereon, and may possibly make difficult the work of extracting the buried reinforcement or the aforementioned detaching work. Furthermore, depending on temperature changes at the site of work, the composition (A) layer may tend to exfoliate from the support body cr the sheet-like substrate, or become sticky. For these reasons, the acid value is more preferably not more than 300 mgKOH/g. Incidentally, the measuring method of the acid value may be later described in detail in the description of examples of the present invention.

The alkaline-water-soluble resin in accordance with the present invention preferably has one glass transition temperature in a range of −80° C. to 120° C., measured by the DSC (differential scanning calorimetry), or more preferably two glass transition temperatures in the same range. The alkaline-water-soluble resin further more preferably has a lower glass transition temperature in a range of −30° C. to 20° C., while a higher glass transition temperature in a range of 40° C. to 100° C. Incidentally, conditions for measurement of the glass transition temperatures, that is, conditions for differential scanning calorimetry will be described later.

Since the lower glass transition temperature is in the range of −30° C. to 20° C., the tenacity of the composition (A) layer at lower temperatures is enhanced, and possibility of exfoliation of the composition (A) layer due to degradation of tenacity from the support body or the sheet-like substrate decreases even when the temperature is very low at the site of work, for example, during winter. Furthermore, since the higher glass transition temperature is in the range of 40° C. to 100° C., it is less likely even when the temperature is high at the site of work, for example, during summer that the composition (A) layer (coating film) becomes sticky or softened thereby easily becoming damaged upon friction with ropes or the like during works. Therefore, in the case where the alkaline-water-soluble resin has the lower glass transition temperature in the range of −30° C. to 20° C. while the higher glass transition temperature in the range of 40° C. to 100° C., a stable resin layer which does not depend on temperature changes at the site of work, that is, the composition (A) layer which is not prone to exfoliation, damage, and stickiness, can be formed. In other words, by controlling the glass transition temperature of the alkaline-water-soluble resin, occurrence of stickiness, cracks, and other problems to the composition (A) layer formed by, for example, applying the foregoing resin to the sheet-like substrate can be suppressed.

The water-absorbent material constituting the composition (A), that is, the water-absorbent material used together with the alkaline-water-soluble resin to compose the composition (A) in the present invention, has no particular limitation except that it is made of a material which is capable of absorbing water. Preferable however is a water-swelling resin, a water-absorbent sheet of fabric or non-woven fabric to which a water-swelling resin is made to adhere, a water-absorbent fiber, or a porous material such as sponge or felt which is capable of absorbing and keeping not less than twice its own weight of water.

In the case where the composition (A), containing the water-absorbent material, for example intervenes between the support body and the hardened body of the hydraulic composition so that the buried reinforcement can be extracted from the hardened body of the hydraulic composition, a layer of the water-absorbent material which has swollen absorbing water is formed between the support body and the hydraulic composition. In other words, since a layer of the water-absorbent material having swollen is formed between the support body and the hardened body of the hydraulic composition, adhesion therebetween can be suppressed. This makes it easy to slipperily move the foregoing buried reinforcement of the present invention, upon extraction of the buried reinforcement from the hardened body of the hydraulic composition, since the water-absorbent material exhibits the lubricating effect. Therefore, labor (pulling force) during the work of extraction of the buried reinforcement from the hardened body of the hydraulic composition can be reduced, whereby the workability thereof can be improved. On the other hand, upon detachment of a part of the hardened body of the hydraulic composition from the support body or upon detachment of the support body from the hardened body of the hydraulic composition, labor required for the detachment is reduced since the adhesion therebetween is suppressed by virtue of the layer of the water-absorbent material having swollen absorbing water, whereby workability of the work of separation between the hardened body of the hydraulic composition and the support body can be improved. Furthermore, gaps can be formed between the buried reinforcement and the hardened body of the hydraulic composition by drying the water-absorbent material up, which further improves the workability of the foregoing work.

A water-swelling resin is particularly suitably used, among the above-cited water-absorbent materials. The water-swelling resin has no particular restriction except that it swells by absorbing water and has a water absorbing capacity of absorbing not less than three times its own weight of deionized water. But a resin which has a water absorbing capacity of absorbing not less than 10 times its own weight of deionized water is more preferable.

As concrete examples of the water-swelling resin, the following may be cited: cross-linked poly(meth)acrylate, cross-linked poly(rreth)acrylate salt, cross-linked poly (meth)acrylate having a sulfonic acid group, cross-linked poly(meth)acrylate having a polyoxyalkylene group, cross-linked poly(meth) acrylamide, cross-linked copolymer of (meth)acrylate salt and (meth)acrylamide, cross-linked copolymer of hydroxyalkyl (meth)acrylate and (meth) acrylate salt, cross-linked polydioxolane, cross-linked polyethylene oxide, cross-linked polyvinyl pyrrolidone, cross-linked sulfonated polystyrene, cross-linked polyvinyl pyridine, saponified starch-poly(meth)acrylonitrile graft copolymer, a reaction product of polyvinyl alcohol with maleic anhydride (salt), cross-linked polyvinyl alcohol sulfonates, polyvinyl alcohol-acrylic acid graft copolymer, and cross-linked polyisobut:ylene maleic acid (salt) copolymer. One of the foregoing water-swelling resins may be used alone, or not less than two of them may be used in combination. Furthermore, another resin may be used together with the water-swelling resin to such an extent that each property (for example, water absorbing capacity) of the water-swelling resin is not impaired.

Out of the foregoing water-swelling resins, one which has a nonionic group and/or a sulfonic acid (salt) group is preferable, or one which has an amide group or a hydroxyalkyl group is more preferable. As examples of such a water-swelling resin, cross-linked copolymer of (meth) acrylic acid salt and (meth)acrylamide, and cross-linked copolymer of hydroxyalkyl (meth)acrylate and (meth) acrylic acid salt may be cited. Furthermore, a water-swelling resin having a polyoxyalkylene group is particularly preferable. As examples of such a water-swelling resin, cross-linked copolymer of ester of (meth)acrylate having a methoxypolyoxialkylene group and (meth)acrylic acid salt may be cited. The water-swelling resin having a methoxypolyoxialkylene group particularly excels in swelling by absorbing alkaline water. Therefore, use of such a foregoing water-swelling resin ensures that such a work as extraction (separation) of the buried reinforcement, detachment of a part of the hardened body of the hydraulic composition from the support body, or detachment of the support body from the hardened body of the hydraulic composition, can be carried out extremely easily.

Furthermore, a resin obtained by polymerizing an ethylenically unsaturated monomer with water solubility and a monomer component optionally incorporating a cross-linking agent may be used as the foregoing water-swelling resin. The water-swelling resin obtained by (co) polymerizing the ethylenically unsaturated monomer excels in swelling by absorbing water, and is usually inexpensive. Therefore, use of such a water-swelling resin remarkably facilitates, in a more economical manner, such a work as extraction of the buried reinforcement, detachment of a part of the hardened body of the hydraulic composition from the support body, or detachment of the support body from the hardened body of the hydraulic composition. Note that the foregoing cross-linking agent is not particularly limited. Further, the water-swelling resin may be formed also by cross-linked straight-chain polymers by either adding a cross-linking agent or projecting electron rays thereto.

Though the ethylenically unsaturated monomer is not particularly limited, the following may be cited as examples of the foregoing ethylenizally unsaturated monomer:

- acrylic acid, methacrylic acid, itaconic acid, maleic acid, fumaric acid, crotonic acid, citraconic acid, vinylsulfonic acid, (meth)arylsulfonic acid, 2-(meth) acrylamide-2-methylpropanesulfonic acid, 2-(meth) acryloylethanesulfoniz acid, 2-(meth) acryloylpropanesulfonic acid, and alkali metal salts and ammonium salts thereof;
- N,N-dimethylaminoethyl (meth)acrylates, and quaternization products thereof;
- (meth)acrylamides such as (meth)acrylamide, N,N-dimethyl (meth)acrylamides, 2-hydroxyethyl (meth) acrylamide, diacetone (meth)acrylamide, N-isopropyl (meth)acrylamide, (meth)acryloylmorpholine, and derivatives thereof;
- hydroxyalkyle (meth)acrylates such as 2-hydroxyethyl (meth)acrylate, and 2-hydroxypropyl (meth)acrylate;
- polyalkylene glycol mono(meth)acrylates such as polyethylene glycol mono(meth)acrylate, polypropylene glycol mono(meth)acrylate, methoxypolyethylene glycol mono(meth)acrylate, and methoxypolypropylene glycol mono(meth)acrylate;
- N-vinyl monomers such as N-vinyl-2-pyrrolidone, and N-vinyl succinimide;
- N-vinyl amide monomers such as N-vinyl formamide, N-vinyl-N-methyl formamide, N-vinyl acetamide, and N-vinyl-N-methylacetamide; and
- vinyl methyl ether.

One of the foregoing ethylenically unsaturated monomers may be used alone, or not less than two of them may be used in combination.

Out of the foregoing ethylenically unsaturated monomers, ethylenically unsaturated monomers each having a nonionic group and/or a sulfonic acid (salt) group are preferable. Among such monomers, particularly preferable are, for example, 2-(meth)acrylamide-2-metylpropanesulfonicacid, 2-(meth)acryloylethanesulfonic acid, 2-(meth) acryloylpropanesulfonic acid, (meth)acrylamide, hydroxyalkyle (meth)acrylate, and methoxypolyethylene glycol mono(meth)acrylate. Furthermore, ethylenically unsaturated monomers each having a polyoxyalkylene group are particularly preferable. A water-swelling resin obtained by polymerizing monomer components containing methoxypolyethylene glycol mono(meth)acrylate particularly excels in swelling by absorbing alkaline water. Therefore, use of the water-swelling resin drastically facilitates the work of extraction of the buried reinforcement and the aforementioned works of detachment.

In the case where not less than two of the ethylenically unsaturated monomers are used in combination as monomer components, a proportion of ethylenically unsaturated monomers having a nonionic group and/or a sulfonic acid (salt) group is preferably not less than 1 wt %, and more preferably not less than 10 wt %. In the case where the proportion is less than 1 wt %, the use of a water-swelling resin obtained by polymerizing the foregoing monomer components may not facilitate the work of extraction of the buried reinforcement and the aforementioned work of detachment.

As examples of a desirable combination of monomer components in the case where not less than two types of ethylenically unsaturated monomers are used in combination, combination of alkali metal (meth)acrylate like sodium acrylate and acrylamide, and combination of alkali metal (meth)acrylate and methoxypolyethylene glycol mono(meth)acrylate may be cited, though the desirable combination is not particularly limited to those.

By polymerizing the foregoing monomer components, a water-swelling resin is obtained. The method for polymerizing the monomer components, i.e., the method for producing the water-swelling resin, is not particularly limited. Furthermore, a mean molecular weight, shape, mean particle diameter, and the like of the water-swelling resin may be determined according to the composition of the hydraulic composition, pH of the alkaline water, working environment conditions, and the like, and are not particularly limited. However, a water-swelling resin to be used preferably has mean particle diameter of not greater than 2,000 $\mu$m, more preferably not greater than 500 $\mu$m, and furthermore preferably not greater than 150 $\mu$m. Use of a water-swelling resin of the foregoing mean particle diameter further improves miscibility of the alkaline-water-soluble resin and the water-swelling resin. Furthermore, in the case where, for example, the composition (A) is made to adhere on a sheet-like substrate, dispersibility and miscibility, for example, of the water-swelling resin in an application solution (fluid dispersion) which will be described later are enhanced, resulting in improvement of handling of the same as well as an increase in an amount of the same adhering per unit area of the sheet-like substrate as compared with the case where the mean particle diameter exceeds 2,000 μm. Consequently, a resin layer (i.e., a layer of the water-absorbent material) can be more easily formed. This further facilitates the extraction of the buried reinforcement, further enhancing the workability of the extracting work.

The water-absorbent material is preferably coated by the alkaline-water-soluble resin. With this, in the case where the support body (that is, the support body on which the composition (A) layer is formed, or the support body which is covered with a covering member with the composition (A) layer formed thereon) or the covering member is occasionally in contact with water due to unexpected wet or precipitation (including acid rain) before the work of construction, the covering member of the present invention is much less likely damaged or the coating film much less likely exfoliates before the work of construction (before use), since the alkaline-water-soluble resin does not easily dissolve in the neutral or acidic water. In a state in which the support body is buried, it is particularly preferable that the presence of the alkaline-water-soluble resin, at the initial stage, prevents the water-absorbing material from swelling, hence suppressing loss (falling off) of the composition (A), particularly the water-absorbent material in the composition (A), and that thereafter as the alkaline-water-soluble resin dissolves, the water-absorbent material absorbs water contained in the hydraulic composition and swells. For this purpose, it is important to appropriately select the type of the alkaline-water-soluble resin as well as to sufficiently coat the water-absorbent material with the alkaline-water-soluble resin.

The respective proportions of the water-absorbent material and the alkaline-water-soluble resin in the composition (A) may be determined according to the respective compositions thereof, combination thereof, and working environment conditions, and is not particularly limited. The proportion (loading) of the water-absorbent material in the total amount of the water-absorbent material and the alkaline-water-soluble resin, however, is preferably not less than 1 wt % and not more than 99 wt %. In the same range, it is more preferably not less than 10 wt %, furthermore preferably not less than 20 wt %, or particularly preferably not less than 30 wt %. In the case where any one of the foregoing ranges of the proportion is further narrowed so as to be not more than 95 wt %, preferably not more than 80 wt %, or further more preferably not more than 70 wt %, loss of the water-absorbent material decreases. Furthermore, it is most preferable that the proportion of the water-absorbent material in the total weight of the coating film composed of the alkaline-water-soluble resin and the water-absorbent material is less than 60 wt % and exceeds 40 wt %. In the case where the proportion of the water-absorbent material is not less than 60 wt %, the ratio of loss of the coating film from the support body or the ratio of loss of the composition (A) from the sheet-like substrate which covers the support body may exceed 50%. Thus, the performance thereof of preventing adhesion between the support body or that covered with the covering member and the hardened body of the hydraulic composition is impaired, resulting in deterioration of the effect of facilitating separation between the support body and the hardened body of the hydraulic composition, particularly the effect of facilitating extraction of the support body or that covered with the covering member from the hardened body of the hydraulic composition in the case where they are buried therein, so as to serve as buried reinforcement. Moreover, in the case where the aforementioned proportion is not more than 40 wt %, sufficient formation of the gel layer between the support body or that covered with the covering member and the hardened body of the hydraulic composition, that is, the layer of the water-absorbent material having swollen, is not achieved, thereby deteriorating the aforementioned adhesion preventing property. In some cases, this results in deterioration of the effect of facilitating separation between the support body and the hardened body of the hydraulic composition, particularly the effect of facilitating extraction of the support body or that covered with the covering member in the case where they are buried so as to serve as buried reinforcement.

In the present invention, the ratio of loss of the coating film (hereinafter referred to as loss ratio) is calculated by the following method. En the case where, for example, the composition (A) is applied to (is made to adhere to) the sheet-like substrate, a change in the weight of the covering member obtained by applying the composition (A) (making the composition (A) to adhere) to the sheet-like substrate, from before soak in deionized water to after the soak therein for 5 minutes (and dry-up), is calculated so as to find an amount of polymer (the alkaline-water-soluble resin plus the water-absorbent material) that has been lost by falling off from the sheet-like substrate, and the amount (g) of the lost polymer is divided by the total amount (g) of polymer adhering to the sheet-like substrate before being soaked in the deionized water. The divided result indicates the loss ratio. In other words, the loss ratio (%) is a value obtained by calculation expressed as:

LOSS RATIO (%)=[(WEIGHT OF COVERING MEMBER BEFORE SOAK (g)−WEIGHT OF COVERING MEMBER AFTER SOAK (g))/(WEIGHT OF COVERING MEMBER BEFORE SOAK (g)−WEIGHT OF SHEET-LIKE SUBSTRATE (g))]×100

Incidentally, in the case where the weight of the sheet-like substrate is unknown, the following method can be applied. The change in weight (an amount of polymer (coating film) having lost) is found by the foregoing method, and subsequently, an amount (g) of polymer (coating film) which has not been lost is found by dissolving or dispersing all of the same in a solvent such as water, alkaline water, or an organic solvent such as methanol and evaporating the solvent so that a non-volatile component is weighed. From the weight of the non-volatile component, the amount (g) of the polymer not having been lost is found, and it is added to the amount (g) of polymer having been lost so that the total amount of polymer (amount of coating film) (g) is found.

Furthermore, in the case where the composition (A) is applied directly to the support body, a piece of the support body (for example, 10 cm×10 cm) is cut out so as to be used as test piece, and the test piece is soaked into deionized water for 5 minutes according to the foregoing method. Thereafter, the deionized water (soak water) in which the polymer (coating film) lost from the sheet-like substrate has been dispersed is evaporated, so that a weight α (g) of the non-volatile component is measured.

The weight α (g) of the non-volatile component is equivalent to an amount (g) of the polymer having been lost. Regarding polymer (coating film) which has not been lost, an amount (g) thereof is found by dissolving or dispersing all of the same in a solvent such as water, alkaline water, or an organic solvent such as methanol, and evaporating the solvent so that a weight β (g) of non-volatile component is measured. From the weight β (g) of the non-volatile component, the amount (g) of the polymer not having been lost is found, and it is added to the amount α (g) of non-volatile component so that the total amount of polymer (coating film amount) (g) is found.

Furthermore, with use of a polyester-cotton blended yarn fabric with basic weight of 150±100 $g/m^2$ as sheet-like substrate to which composition (A) is to be applied, a test piece may be prepared by applying the composition (A) on the foregoing sheet-like substrate and subsequently drying it, so that the loss ratio of the composition (A) is found in advance before actually the composition (A) is applied to the support body or sheet-like substrate to be used, that is, the loss ratio of the composition (A) before application (adhesion) (application solution in the fluid dispersion state) can be measured in advance.

In the case where the reinforcement is constructed by driving into a bore hole filled with the hydraulic composition, usually friction is exerted to a covering member as well. If the driving is smoothly carried out, no problem arises since the construction by driving is finished within a short time (about 1 minute). By contrast, in the case where the buried reinforcement is long, the time required for driving the same increases and the pressure of mud including the hydraulic composition becomes greater at a deeper position thereby increasing the friction. As a result, the composition (A) is likely to be scratched away from the reinforcement and its effect of facilitating extraction is drastically impaired. Furthermore, in the case where the time required for driving the reinforcement is extended due to reinsertion or the like, the adhering polymer (composition (A)) also becomes prone to falling off, thereby impairing its effect of facilitating the extraction. Therefore, the loss ratio is preferably not more than 50%, more preferably not more than 30%. In the case where the loss ratio exceeds 50%, the effect of facilitating extraction of the reinforcement is sometimes impaired as described above. In other words, in the case where the loss ratio of the composition (A) is not higher than 50%, loss of the composition (A) (alkaline-water-soluble resin and water-absorbent material) from the buried reinforcement before or during construction can be further suppressed, thereby allowing formation of a separation-facilitating layer, i.e., a layer of the water-absorbent material, between the buried reinforcement and the hardened body of the hydraulic composition. Therefore, labor (pulling force) required for the work of extracting the buried reinforcement, i.e., the support body or that covered with the covering member, from the hardened body of the hydraulic composition can be reduced, whereby the workability of the work can be improved.

In the case where the composition (A) is applied to the sheet-like substrate, the composition (A) may contain a plasticizing agent such as polyhydric alcohol, when necessary, to such an extent that the performance of the coating layer (coating film) made of the composition (A) is not hindered, so that the covering member may have flexibility and that its handiness may be improved.

The method for applying the composition (A) (making the composition (A) to adhere) to the support body or the sheet-like substrate to form the resin layer (coating film) is not particularly limited, but in concrete terms a method such as the following may be used: a method in which a fluid dispersion obtained by dispersing the water-absorbent material and the alkaline-water-soluble resin in dispersion medium such as an organic solvent is splayed to surfaces of the support body or the sheet-like substrate; a method in which the foregoing fluid dispersion is brushed or rolled over surfaces of the support body or the sheet-like substrate; or a method in which the sheet-like substrate is soaked with the fluid dispersion. Alternatively, another method may be used in which a fluid dispersion containing the alkaline-water-soluble resin is splayed or applied lo surfaces of the support body or the sheet-like substrate, then, the water-absorbent material such as the water-swelling resin is evenly spread thereover, and further, the foregoing fluid dispersion is sprayed or applied thereover. Among the above-cited methods, the method in which a fluid dispersion obtained by dispersing the water-absorbent material and the alkaline-water-soluble resin in dispersion medium such as an organic solvent is splayed or applied to surfaces of the support body or the sheet-like substrate is particularly preferable, from the viewpoint of convenience in working and manufacturing.

The composition (A) may be applied to portions (areas) at which adhesion between the support body or that covered with the covering member and the hardened body of the hydraulic composition is desirably prevented, but there is no problem if the composition (A) is also applied to the other portions (areas). Further, as long as adhesion is prevented, there is no problem if there are irregular application or application deficiencies. The fluid dispersion applied (adhered) to the support body or the sheet-like substrate may be dried as required. In such a case, a layer (coating film) made of the composition (A) is formed on the support body or a surface (external or internal) of the sheet-like substrate. Furthermore, in the case where the alkaline-water-soluble resin is prepared by the solution polymerization method, preparation of the fluid dispersion is easy, since the fluid dispersion is obtained by only mixing the water-absorbent material in the solution after polymerization.

Regarding the sheet-like substrate, i.e., the covering member, a layer of the composition (A) layer (resin layer) may be formed on an external or internal surface of the sheet-like substrate in a state of covering the support body. In the case where, however, the support body is for example covered with the sheet-like substrate (in a bag form) to which the composition (A) is adhered, it is preferable that the surface with the composition (A) applied comes on the internal side of the sheet-like substrate covering the support body, or in other words, the layer (coating film) of the composition (A) intervenes between the support body and the sheet-like substrate, since this arrangement can minimize exfoliation of the coating film thereby allowing high adhesion prevention effect to be maintained. This is for the following reason: when a buried reinforcement such as the support body or that covered with the covering member is driven into the hydraulic composition such as cement water (cement composition) containing earth and sand in a bore hole, friction with the cement water, earth and sand occurs, but the coating film disposed on an internal side is not brought into direct contact with the cement water, earth, and sand, whereby exfoliation of the coating film is avoidable. Therefore, this facilitates extraction of a buried reinforcement from the hardened hydraulic composition (for example, cement composition such as soil cement), for example, extraction of a buried reinforcement in the case where the peristylar soil cement continuous wall technique is applied. Particularly in the case where the same reinforcement is repeatedly subjected to insertion several times (reinsertion of reinforcement is conducted), disposition of the composition (A) on the internal side of the sheet-like substrate (covering member) covering the support body (internal-side application) yields an excellent effect in terms of not impairing the effect of facilitating extraction of the reinforcement, i.e., extraction of the support body.

On the other hand, under the normal condition in which reinsertion is carried out few times, in the case where the layer of the composition (A) is disposed on an external side of the sheet-like substrate covering the support body, a surface of the reinforcement so extracted (surface of the support body) can remain undamaged, since the work of extracting the buried reinforcement from the hardened body of the hydraulic composition, i.e., the work of extracting the support body, is further facilitated, while the alkaline-water-soluble resin dissolving in alkaline water less adheres to the reinforcement. In this way, which surface of the covering member the composition (A) is to be applied is appropriately determined according to the conditions of construction. It is possible to apply the composition (A) on surfaces of both sides, so as to ensure separation between the support body and the hardened body of hydraulic composition.

The method for preparation of the foregoing fluid dispersion (resin dispersion) containing the alkaline-water-soluble resin and the water-absorbent material is not particularly limited. As concrete examples of the organic solvent used in the dispersion medium, the following may be cited, though the organic solvent is not limited to these: methyl alcohol, ethyl alcohol, isopropyl alcohol, benzene, toluene, acetone, methyl ethyl keton, ethyl acetate, and butyl acetate; and polyhydric alcohols including ethylene glycol, ethylene glycol monomethylether, propylene glycol monomethylether, ethylene glycol monomethylether acetate, propylene glycol monomethylether acetate, and polypropylene glycol monomethylether acetate, and derivatives thereof.

Generally, in the case where an organic solvent with a low boiling point is used, time required for removing dispersion medium by drying can be shortened, allowing the time till formation of the coating film to be shortened; on the other hand, in the case where an organic solvent with a high boiling point is used, time required for removing dispersion medium by drying is prolonged, allowing operations to be carried out during a longer time. Therefore, as the organic solvent, an appropriate chemical compound may be selected according to conditions such as working environment conditions.

Incidentally, though alkaline water may be used as the dispersion medium, that is not preferable, since the use of a water-based medium causes the water-absorbent material (for example, water-swelling resin) to swell, making brushing or spraying of the composition (A) difficult as well as making the subsequent work of drying it time-consuming.

About 10 $\mu$m is enough for the film thickness of the composition (A) layer, but the film thickness may be determined according to a particle diameter of the water-absorbent material, that is, for example, water-swelling resin, and has no particular restriction.

A ratio of the composition (A) layer (coating film) with respect to the support body or the sheet-like substrate, that is, an amount of alkaline-water-soluble resin and water-absorbent material (preferably water-swelling resin) adhering to a unit area in a desired portion of the support body or the sheet-like substrate may be set according to respective compositions thereof, combination thereof, working environment conditions, and the like, and has no particular restriction. The foregoing amount, however, is preferably in a range of 1 $g/m^2$ to 10,000 $g/m^2$, more preferably in a range of 10 $g/m^2$ to 5,000 $g/m^2$, and particularly preferably in a range of 20 $g/m^2$ to 1,000 $g/m^2$.

As the foregoing amount of the composition (A) per unit area is greater, however, longer time is required for formation of the composition (A) layer (coating film), resulting in economical disadvantage. Therefore, considering the time required for formation of the composition (A) layer and an effect achieved in each case, the foregoing amount of the composition (A) per unit area is more preferably in a range of 40 $g/m^2$ to 700 $g/m^2$, particularly preferably in a rance of 50 $g/m^2$ to 500 $g/m^2$ and most preferably in a range of 80 $g/m^2$ to 300 $g/m^2$.

Incidentally, a ratio of the alkaline-water-soluble resin and the water-absorbent material (for example, water-swelling resin) with respect to 100 parts by weight of the sheet-like substrate is preferably in a range of 1 part by weight to 10,000 parts by weight, more preferably in a range of 10 parts by weight to 1,000 parts by weight, and particularly preferably in a range of 20 parts by weight to 500 parts by weight.

The alkaline-water-soluble resin in the layer thus applied (coating film) is not soluble in water such as precipitation with a pH level in a range of neutrality and acidity, upon contact therewith. In other words, the alkaline-water-soluble resin excels in water resistance, and does not become damaged upon contact with water with a pH level in a range of neutrality and acidity. Therefore, for construction of the structure of the present invention, it is possible to simply apply the composition (A) (make the composition (A) adhere) to the support body in advance and store the support body in such a state, and hence there is no need to apply the composition (A) to the support body at the site of work. Thus, it is possible to simplify and rationalize works, thereby allowing the construction to be smoothly promoted. For construction of the structure of the present invention, though the support body may be covered with the covering member at the site of work, it is also possible to simply cover the support body with the covering member in advance and pile the support body in such a state in the open air at the site of work. In short, it is possible to simplify and rationalize works as required according to conditions of the site of work, thereby allowing the construction to be smoothly promoted.

On the other hand, the alkaline-water-soluble resin dissolves in alkaline water upon contact therewith. More specifically, the composition (A) is arranged so that, upon contact with the hydraulic composition, the alkaline-water-soluble resin therein starts to dissolve and the water-absorbent material therein swells by absorption thereby forming a layer of the same between the hydraulic composition and the support body (more specifically, either (i) between the hydraulic composition and the support body in the case where the composition (A) is applied to a surface of the support body, or (ii) between the hydraulic composition and the sheet-like substrate (covering member) covering the support body and/or between the sheet-like substrate (covering member) buried in the hydraulic composition and the support body in the case where the composition (A) is applied to the sheet-like substrate. Therefore, it is possible to improve workability of the work of extracting the support body from the hardened body of the hydraulic composition, or the work of exfoliating the hardened body of the hydraulic composition from the support body.

Furthermore, for example, in the case where the support body and the covering member, or the support body covered with the covering member, is stored, in order that the water-absorbent material composing the foregoing composition (A) does not swell by absorbing water of precipitation, night dew, or water from earth even if the support body and the covering member left in the open air for a long period at a material storing site or the like, a water resistance applying agent may be applied (made to adhere) to a surface of the composition (A) layer (coating film) as required, whereby formed is a coating film which does not become damaged (dissolve, deteriorate, or the like) upon contact with water such as rain with a pH level in a range of neutrality and acidity, that is, a waterproof coat in accordance with the present invention.

Note that, however, the waterproof coat does not hinders dissolution of the alkaline-water-soluble resin of the composition (A) into alkaline water, or namely, does not prevent the alkaline water from causing the water-absorbent material in the composition (A) to swell. In other words, the foregoing water resistance applying agent may be such a chemical compound that a layer of the same formed on (top-coating) a surface of the composition (A) layer (coating film) prevents or suppresses the swelling of the water-absorbent material by absorption water such as rain with a pH level in a range of neutrality and acidity.

As examples of the water resistance applying agent, the aforementioned alkaline-water-solvent resin, known water repellent agents such as wax-based or silicone-based water repellent agents. It however is not particularly limited, and may be selected by considering combination thereof with a surface processing agent and the like. The method for applying the water resistance applying agent to a surface of the composition (A) layer (coating film) so as to form a waterproof coat is not particularly restricted, but in concrete terms, the following may be cited as examples: a method in which a fluid dispersion obtained by dispersing the water resistance applying agent in any one of the above-cited organic solvents, i.e., a fluid dispersion of the water resistance applying agent, is sprayed over a surface of the composition (A) layer; and, a method in which such a fluid dispersion is brushed over a surface of the composition (A) layer. The fluid dispersion applied over the surface of the composition (A) layer may be dried when necessary. In so doing, a waterproof coat made of a water resistance applying agent is formed on a surface of the coating film. A quantity of a waterproof coat per unit area of 50 $g/m^2$ may be sufficient, though the foregoing quantity is not particularly limited.

The foregoing arrangement wherein the waterproof coat is formed, the following effect can be achieved: in the case where the support body or the covering member coated with the composition (A), or the support body covered with the covering member is stored, it scarcely occurs that the water-absorbent material composing the composition (A) absorbs water of precipitation, night dew, or water from earth, thereby causing the coating film to be lost, even if the support body or the covering member (the support body or the covering member coated with the composition (A), or the support body covered with the covering member) is left in the open air for a long period at a material storing site or the like. In other words, since the waterproof coat is formed, in the case where a structure is constructed by using the support body as the buried reinforcement, the waterproof coat prevents or suppresses the swelling of the water-absorbent material even if the reinforcement becomes wet before construction, and therefore it is even possible to save time and labor of covering the reinforcement and the covering member with a waterproof sheet, or to make it unnecessary to store the reinforcement and the covering member at an indoor material storing site. Therefore, it is possible to store the reinforcement and covering member in a simpler and more inexpensive manner.

Incidentally, for example, the alkaline-water-soluble resin composing the waterproof coat starts dissolving upon contact with a hydraulic composition. Therefore, in construction of the structure, there is no need to exfoliate the waterproof coat from the coating-film-disposed surface (i.e., the composition (A) layer on whose surface the waterproof coat is formed) prior to the construction. In other words, the support body on which the waterproof coat is formed, or the support body covered with the covering member on which the waterproof coat is formed can be used as it is, in construction of the structure.

The following description will describe a method for covering the support body with the covering member.

The foregoing support body and covering member are in contact with each other but are not fixed to each other, in a state in which the support body is covered with the covering member. In other words, the covering member of the present invention is non-adhesive (non-stuck) covering member. Therefore, a gap is formed between the support body and the covering member to which alkaline water can permeate, and hence, the water-swelling property of the water-absorbent material is further enhanced thereby further suppressing the adhesion between the both. Then, a multiplier effect thereof with the lubricating effect of the swollen water-absorbent material facilitates the work of extracting the support body to a great extent.

Furthermore, in the present invention, since the covering member is not directly fixed to the support body, the covering member can be brought into contact with water contained in the hydraulic composition on both the sides (internal and external sides) of the covering member. Therefore, this facilitates formation of a separation-facilitating layer, i.e., the layer of the water-absorbent material swelling by absorbing water, between the support body and the hardened body of the hydraulic composition. Furthermore, since the composition (A) layer (coating film) is formed on the sheet-like substrate which is made of, for example, soft woven fabric to which the fluid dispersion of the composition (A) is permeable, the alkaline-water-soluble resin in the composition (A) is firmly adhered (bonded) to the sheet-like substrate. For this reason, loss of the water-absorbent material in the composition (A) from the sheet-like substrate prior to or before construction work can be suppressed.

Furthermore, to cover the support body with the covering member, it is desirable to use one piece of the covering member to cover one support body, but it is possible to use not less than two pieces of the covering members with respect to one support body. Therefore, as a method of covering the support body with the covering member, for example, a method of nipping the support body between opposed two pieces of covering members each being formed in a sheet form can be selected.

Incidentally, in the present invention, “covering” does not mean covering the support body with the covering member to such an extent that the support body is hidden behind the covering member, but means covering the support body with the covering member to such an extent that extraction of the support body from the hardened body of the hydraulic composition is facilitated, that is, to such an extent that adhesion therebetween can be suppressed.

As concrete examples of the method for covering the support body with the covering member, the following methods may be cited, though the method is not limited to these: a method in which the support body is covered with the covering member formed in a bag or tube shape; a method in which the support body is inserted into the covering member formed in a bag or tube shape; a method in which the support body is wrapped by the covering member which is formed in a sheet form; and, a method in which the covering member is fixed to the support body with use of fixtures or the like. Furthermore, when the support body is covered with the covering member, it is more preferable that the shape of the covering member is made to conform with the shape of the supporting member so that the covering member is fitted to the support body. With this, the accuracy in positioning the support body when it is buried (accuracy in driving) is further enhanced.

As concrete examples of a method for forming the covering member in a bag or tube shape, the following methods may be cited, though the method is limited to these: a method in which an adhesive is applied to portions to be bonded; a method in which heat seal is applied to fuse portions to be bonded; a method in which portions to be bonded are sewn; and, a method in which wires or ropes are used to fasten. A packed state of the covering member in transportation is not particularly limited, but a rolled state (see FIGS. 5(*a*) and 5(*b*)) or a corrugated state are preferable from the viewpoints of ease of handling and workability.

A timing at which the support body is covered with the covering member is not particularly limited, and it may be any appropriate timing in advance of the transportation of the support body to the site of work, any appropriate timing while the support body is stored at the site of work, or any appropriate timing in advance of placement of the support body. In other words, the support body is covered at any timing as long as the covering is finished by the time when the support body is buried. In the case where the covering member in a bag or tube shape is used, the covering member may be formed into such a shape at any timing as long as the formation is finished by the time when the support body is buried.

Figures 5, 5A:
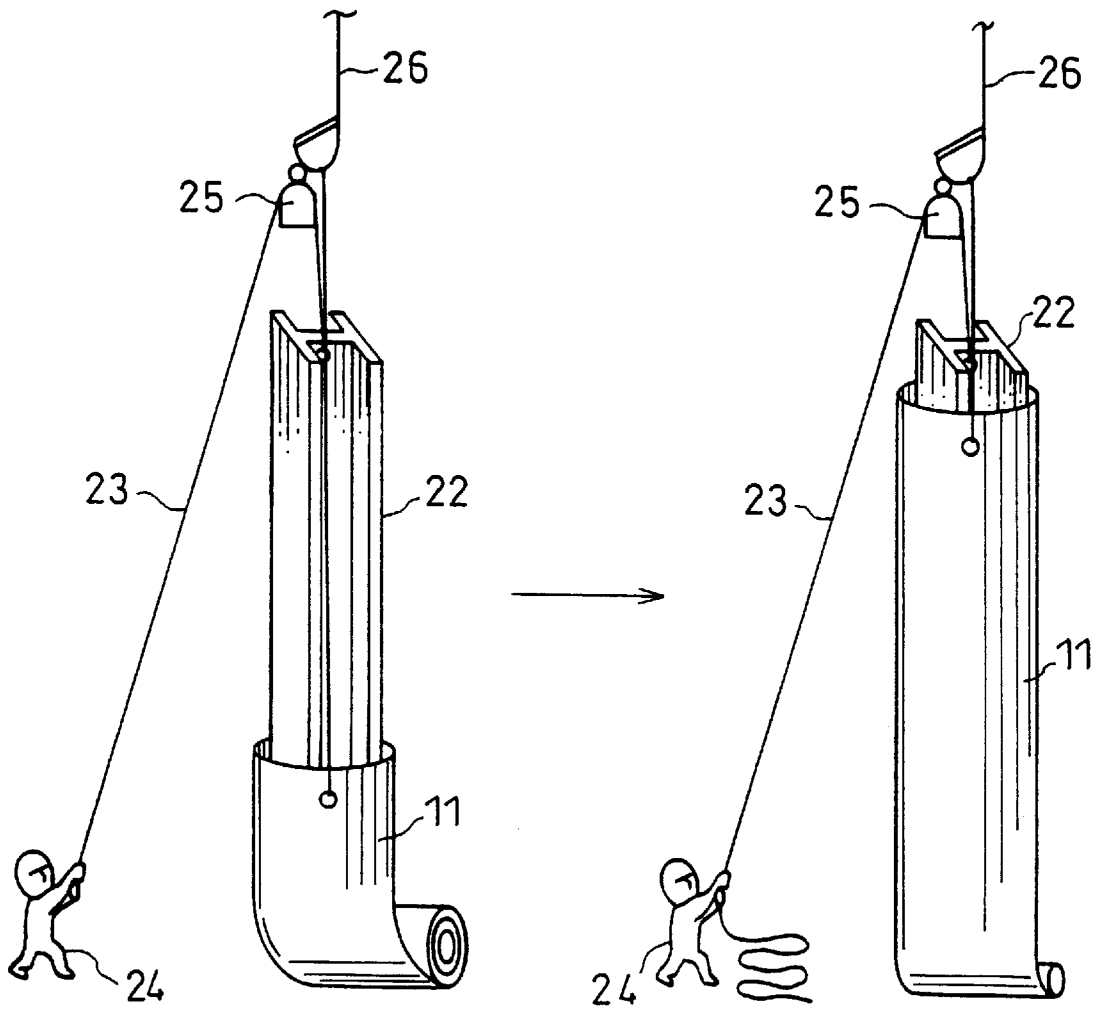
FIGS. 5(*a*) and 5(*b*) are perspective views illustrating steps of a method for covering a support body with a covering member in accordance with an embodiment of the present invention.
Figure 6:
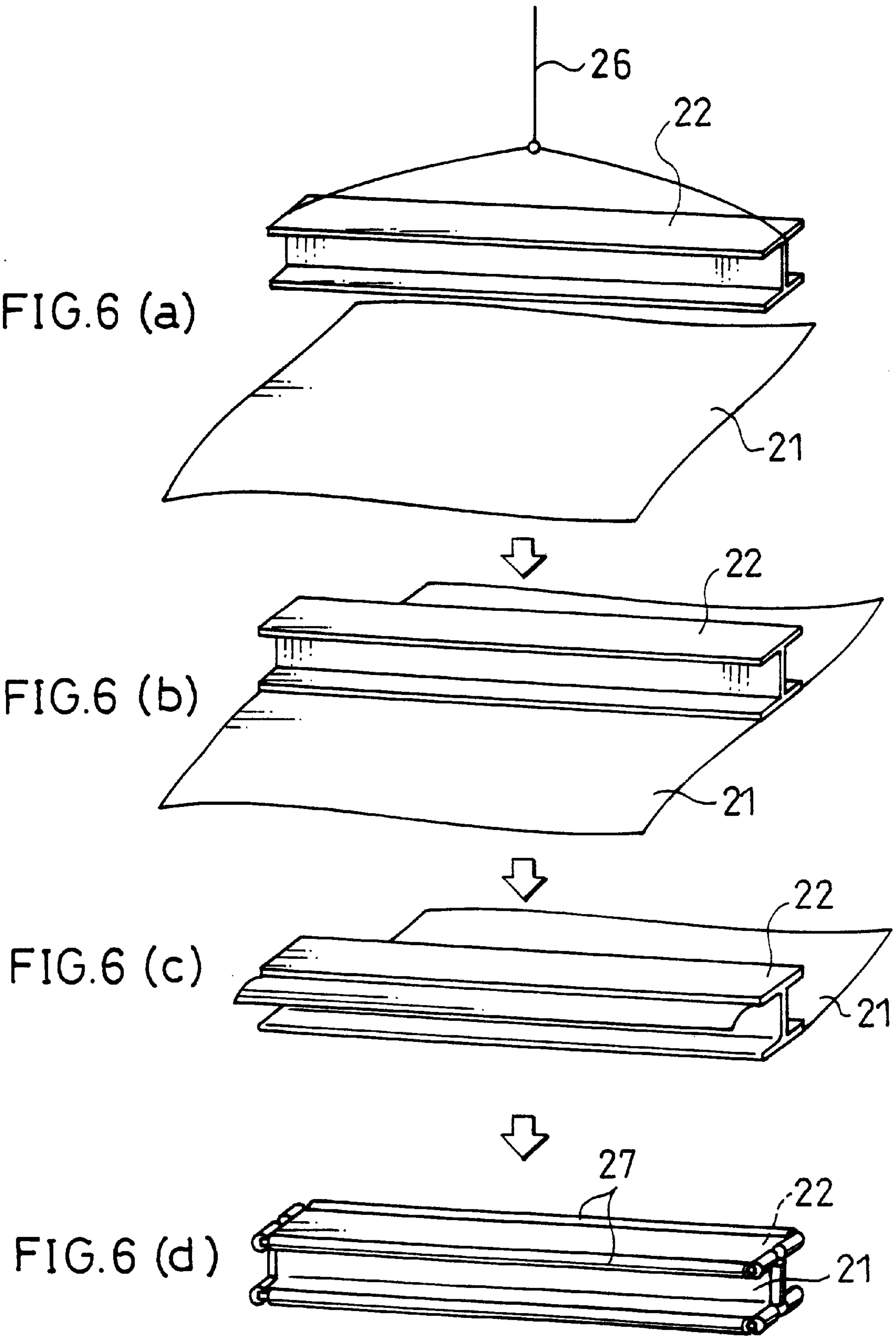
FIGS. 6(*a*) through 6(*d*) are perspective views illustrating steps of a method for covering a support body with a covering member in accordance with another embodiment of the present invention.

As more concrete examples of a method for covering the support body with the covering member, the following methods may be cited, though the method is not limited to these:

- a method in which, as shown in FIG. 5 (*a*), a support body 22 (buried reinforcement) is kept suspended as by a crane 26 and a bag-shaped or tube-shaped covering member 11 is lifted with a cord 23 through the medium of a pulley 25 provided at the end of the crane 26, the cord 23 being attached to an upper end of the covering member 11 and handled by a human being 24 for example, as if the support body 22 would be caused to pull on the covering member 11, and then, the cord 23 is further pulled by the human being 24 until the support body 22 so that the covering member 11 becomes fitted to the support body 22 as shown in FIG. 5(*b*);
- a method in which a tube-shaped covering member is slipped on one end of a support body and an upper end of the covering member is fixed to the support body, then the support body is lifted as with a crane, and subsequently the covering member is pulled down with a cord handled by a human being for example, the cord being attached to a lower end of the covering material, and the covering member is fitted and fixed to the support body;
- a method in which a covering member formed in a bag or tube shape is placed on the earth or the like, then a support body is inserted into the covering member, and subsequently the covering member is lifted up until it becomes fitted to the support body and is fixed thereto;
- a method in which a support body is placed on the earth or the like, then it is covered with a covering member formed in a bag or tube shape, and subsequently the support body is suspended while the covering member is lifted up, and is fixed thereto;
- a method in which, as shown in FIG. 6(*a*), a support body 22 is placed by using a crane 26 or the like onto a covering member 21 formed in a sheet form, then as shown in FIGS. 6(*b*) and 6(*c*), the support body 22 is wrapped by the covering member 21, and subsequently the covering member 21 is fixed thereto with use of fixtures 27 as shown in FIG. 6(*d*);
- a method in which a support body is fit in a covering member folded in a corrugation form, and is fixed thereto;
- a method in which ends of a covering member are fixed to upper and lower ends of the support body, respectively;
- a method in which ends of a covering member are fixed to upper and lower ends of the support body, respectively, while the covering member is also fixed to the support body with a wire (annealing wire), a cord, a belt, an adhesive tape, or the like provided in the vicinity of the center; and
- a method in which a part of a covering member is fixed to an upper part of a support body, while the other part of the covering member is let to hang down along the support body.

Among the foregoing methods, the method in which a covering member formed in a bag or tube shape is lifted as if a support body would be caused to pull on the covering member, and the method in which a support body is wrapped with a covering member formed in a sheet form are preferable since they excel in workability of the work of covering. In the case of the method in which a support body is wrapped with a bag- or tube-shaped covering member, it is possible to provide a covering member to a large and heavy support body such as an H-shaped steel in an easy manner. In short, it is possible to wrap such a support body with a covering member in an easy manner.

Incidentally, a method of fixing a covering member to a support body is not particularly limited. As concrete examples of the aforementioned fixture 27, a clothespin, a clip, a binder such as a cap which is produced by lengthwise cut a tube such as rubber hose or a tube made of a heat insulating foamed material, a wire (annealing wire), a cord, a belt, and an adhesive tape may be cited, though it is not particularly limited.

Figure 7:
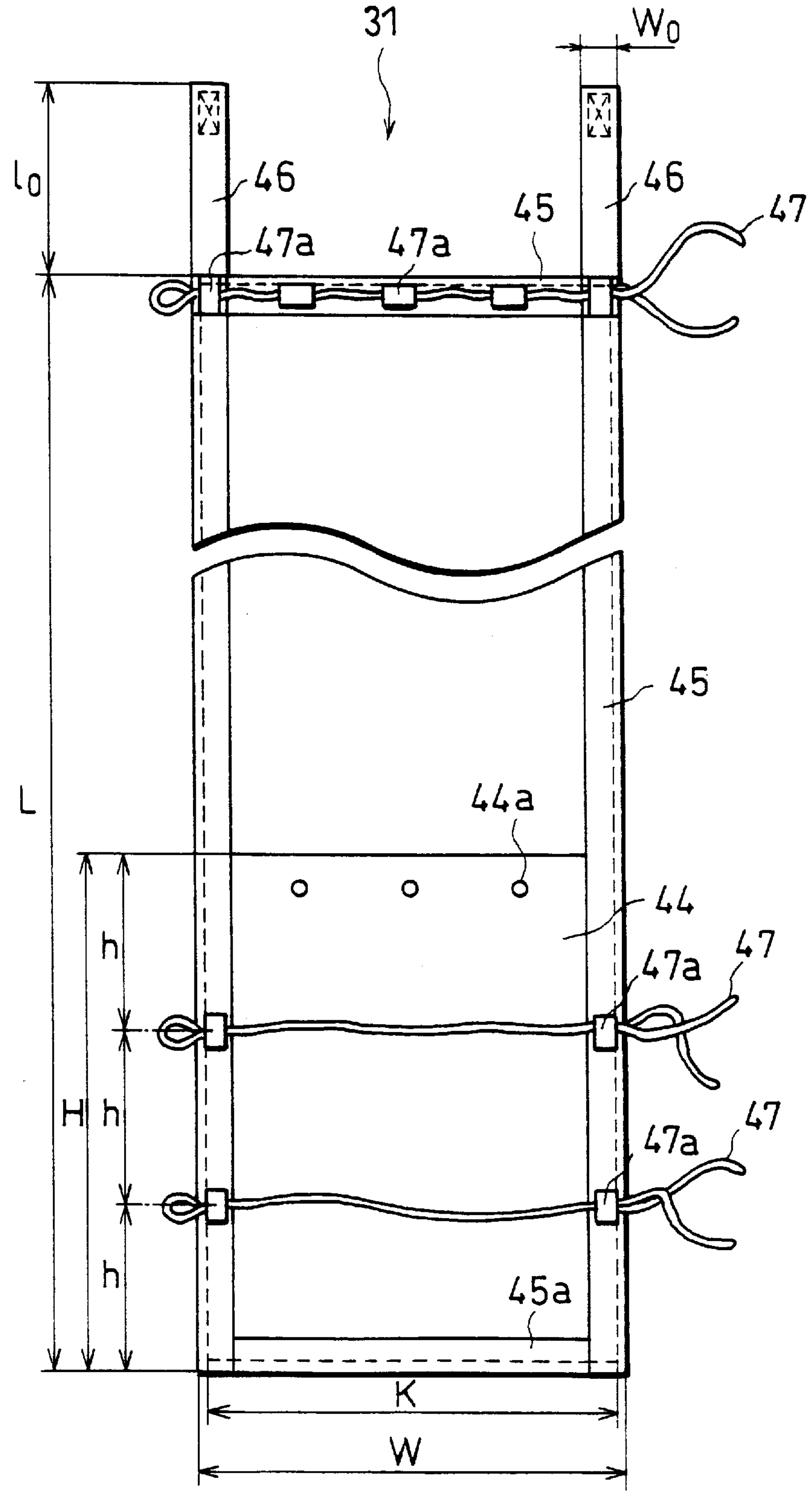
FIG. 7 is an explanatory view illustrating a state of a sheet-like substrate formed in a bag shape.

A size of the bag- or tube-shaped covering member is appropriately set according to a size and a shape of a support body used, and is not particularly restricted. For example, in the case of a covering member 31 formed in a bag shape as shown in FIG. 7, two types are applicable, one having a length L and a width W of 23 m and 1.4 m respectively according to a specification 1, while the other having L and W of 14.5 m and 1.4 m respectively according to a specification 2 (differing from the specification 1 in the length).

The foregoing sheet-like substrate of the covering member is made of a material having a strength enough to make sure that the material is not damaged upon application of various external forces which tend to be exerted during construction of a soil structure, but a reinforcing member may be laminated on a surface of the covering member so as to reinforce the covering member. This is because a considerably great weight is laid on the covering member upon the driving of a support body covered with the covering member into a bore hole since the support body such as an H-shaped steel usually has a weight of about 1 t, and because, in the case where the bore hole is filled with a hydraulic composition such as cement composition, a considerably great pressure is applied to the support body from the hydraulic composition, resulting in that a considerably great pressure is also applied to the covering member covering the support body.

Figure 8:
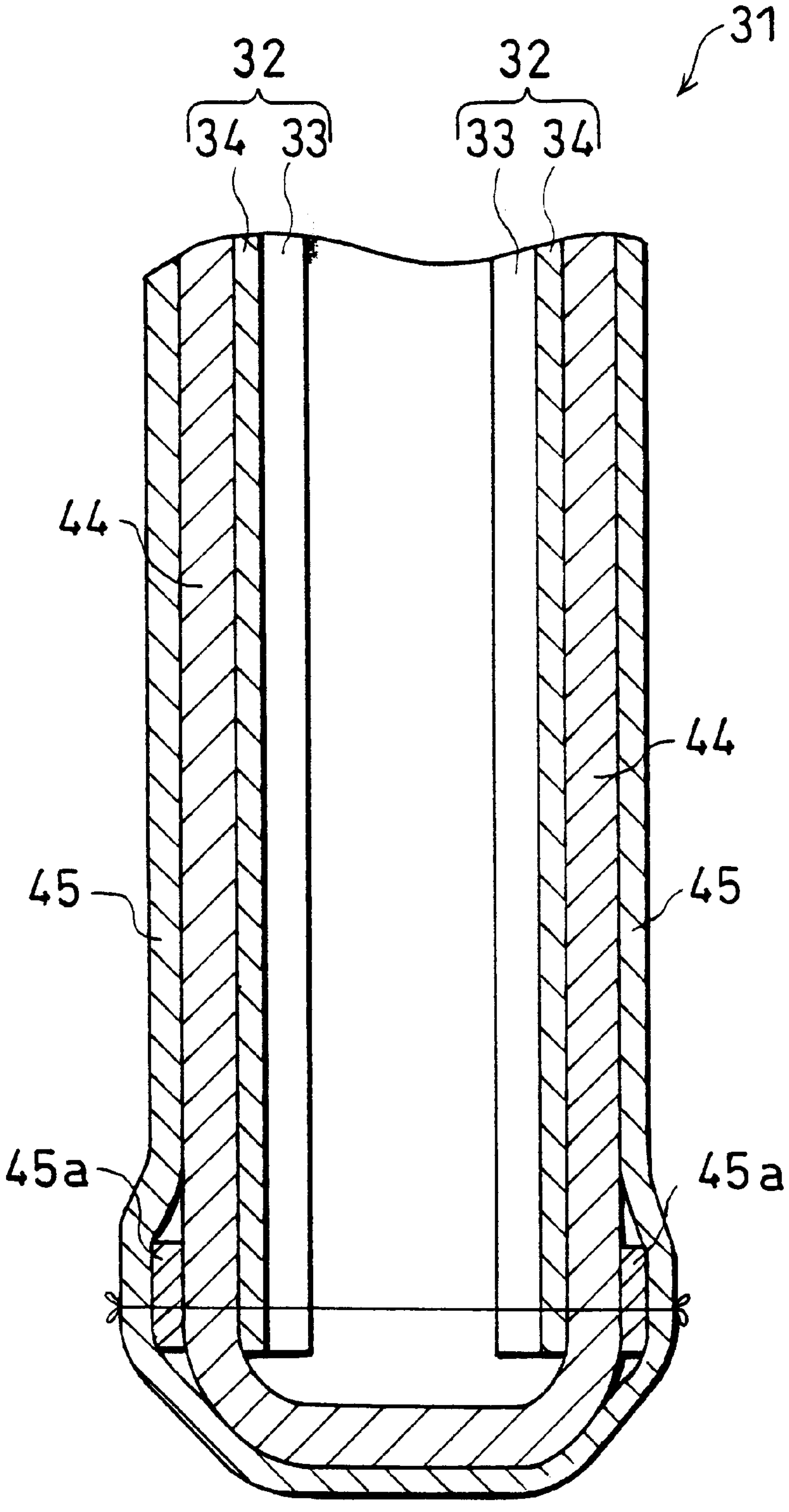
FIG. 8 is a cross-sectional view illustrating a schematic arrangement of a reinforcing belt which turns around a bottom part of the sheet-like substrate shown in FIG. 7.

The covering member 31 shown in FIG. 8 is arranged so that a reinforcing member 34 is laminated over a surface of a sheet-like substrate 33 on which the composition (A) is applied. In other words, the covering member 31 has a covering member base 32 composed of the reinforcing member 34 as an external bag and the sheet-like substrate 33 with the composition (A) applied thereon as an internal bag, the external bag being provided over the internal bag. As the reinforcing member 34, split fiber non-woven fabric ("WARIFU" (Japanese trade name), LX-14, produced by Nihon Plast Co., Ltd.) or the like may be used, which is formed into, for example, a bag shape with a size according to the specification 1 or 2. As the sheet-like substrate 33 on which the composition (A) is applied, the aforementioned sheet-like substrate is used, and is likewise formed into a bag shape with a size according to the specification 1 or 2. Furthermore, a waterproof coat is formed on a surface of the composition (A) layer, as required. As the reinforcing member 34, a material identical to that of the aforementioned sheet-like substrate may be used.

The covering member 31 is preferably formed into a bag or tube shape by sewing. In the case where it is formed by sewing, a second reinforcing member is preferably applied so as to cover seams so that strength of the seams is increased.

For example, in the case where, as shown in FIGS. 7 and 8, an end cover 44 is provided as a second reinforcing member to a bottom part of the covering member 31, whereby the structure of the bottom of the bag (the covering member 31) is further reinforced. The end cover 44 is preferably sewn to the covering member 31 together with a reinforcing belt described later. As shown in FIG. 7, it is possible to fix an upper edge of the end cover 44 to the covering member 31 with use of adhesive fastenings 44*a*. A material for the end cover 44 is not particularly limited, and any one of the aforementioned materials for the reinforcing member 34, that is, materials identical to that for the sheet-like substrate can be suitably used. Felt or the like is particularly preferable among others, from the viewpoint of strength.

Furthermore, in the case where the covering member is formed into a bag or tube shape as described above, it is necessary to sew peripheral portions of the bag or the tube in some cases. Here, it is preferable to reinforce the peripheral portions (seams) of the bag or the tube with use of a reinforcing belt as a third reinforcing member. For example, as shown in FIG. 7, a reinforcing belt 45*a* with a predetermined width $W_0$ is sewn, for reinforcement, to a lower portion (seam) of the covering member 31 formed into a rectangular bag shape, while reinforcing belts with a predetermined width $W_0$ each are sewn to the other seams of the peripheral portions of the covering member 31, so that the peripheral portions of the covering member 31 on the four sides thereof are reinforced. This allows the shape of the bag (covering member 31) to be further stabilized. For this reason, damage to the covering member 31 can be avoided even in the case where the covering member 31 wraps a large and heavy support body such as an H-shaped steel. Incidentally, a material and a width WC of the reinforcing belts 45 and 45*a* are not particularly limited, but, for example, a belt made of polypropylene having a width $W_0$ of 5 cm is used as each of the reinforcing belts 45 and 45*a*.

The reinforcing belts 45 and 45*a* are preferably sewn along peripheries of a bag or a tube (covering member 31), but margins for seams are not particularly limited. The margins may be set to, for example, 1 cm from each periphery.

In the case where the covering member 31 is formed into a bag shape, the reinforcing belt 45 is preferably arranged so as to turn around the bottom part of the covering member 31 as shown in FIG. 8. Note that FIG. 8 is a schematic cross-sectional view showing the arrangement of the reinforcing belt 45 which turns around the bottom part of the covering member 31, and is more specifically a schematic cross-sectional view illustrating an arrangement of the reinforcing belt 45 which turns around the bottom part of the covering member 31, the view being obtained by cutting the covering member 31 along the reinforcing belt 45 which reinforces a seam of the side part of the covering member 31 shown in FIG. 7. In FIG. 8, a line (thread) with knots connecting the reinforcing belts 45 and 45*a*, the end cover 44, and the covering member base 32 indicates that the reinforcing belts 45 and 45*a*, the end cover 44, and the covering member base 32 are sewn as shown in FIG. 7.

Thus, the sheet-like substrate 33 (covering member base 32) on which the reinforcing member 34 is laminated is formed into a bag shape with the bottom edges sewn to each other, and the end cover 44 as the second reinforcing member 44 is attached to the bottom part. In this state, the reinforcing belts 45*a* are sewn to each other, and further, the reinforcing belts 45 are sewn to the bag so that the reinforcing belts 45 turn around the bottom. Thus, the covering member 31 obtained by so doing has a further reinforced bottom of the covering member 31.

Furthermore, ends of the reinforcing belts 45 on a side of an opening end of the bag (covering member 31) may be left so as to constitute suspension cords 46. The length $l_0$ of each suspension cord 46 is not particularly limited, and may be about 1 m, for example, in the present embodiment. The suspension cords 46 may be used for lifting up or down the bag upon attachment of the bag to the support body. Note that each end of the suspension cords 46 preferably has a turn-up structure for reinforcement as shown in FIG. 7.

Furthermore, it is preferable that a fastening cord 47 is provided at least in the vicinity of the opening end of the bag (covering member 31), as shown in FIG. 7. Fastening the opening end with the fastening cord 47 allows the bag (covering member 31) to be stably attached to the support body. Likewise, another fastening cord 47 is preferably provided on the lower side (bottom side) of the bag. This allows the bag to be more stably attached to the support body. When, for example, the support body is placed into cement composition such as soil cement, such an accident that the bag comes off from the support body and becomes torn is avoidable.

Among the foregoing fastening cords 47, that provided on the opening end side of the bag is disposed along the reinforcing belt 45 provided around the opening, as shown in FIG. 7. In other words, the fastening cord 47 is disposed so as to cross the lengthwise direction of the rectangular bag.

On the other hand, that provided on the bottom side, like that provided on the opening end side, is disposed so as to cross the lengthwise direction of the rectangular bag. Here, a plurality (for example, two) of the fastening cords 47 may be provided on the bottom side, as shown in FIG. 7. In the case where a plurality of the fastening cords 47 are provided, the bag (covering member 31) may be attached to the support body in a more stable state.

The fastening cord 47 on the bottom side is disposed over the aforementioned end cover 44, but the concrete position of the fastening cord 47 has no particular restriction except that the fastening cord 47 helps the bottom part of the bag to be fitted to the end of the support body in a stable manner. For example, as shown in FIG. 7, in the case where the end cover 44 has a length H of 3 m in the lengthwise direction, a first fastening cord 47 may be provided at a distance h of 1 m from the bottom, a second fastening cord 47 at a distance of 2 m from the bottom, i.e., a position of a distance h of 1 meter from the first fastening cord 47.

Here, the arrangement for provision of each fastening cord 47 has no particular limitation. As an example of such an arrangement, an arrangement as shown in FIG. 7 in which a plurality of cord carriers 47*a* are provided on the reinforcing belt 45 which is disposed around the bag (covering member 31) so as to cross the lengthwise direction of the bag may be cited.

The length of each fastening cord 47 has no particular restriction except that it is enough to fasten the covering member 31 in a state in which the covering member is fitted to the support body, but for the fastening of the cords 47, it is preferable that, in a state in which the fastening cord 47 is let through the cord carriers 47*a* so as to run around the bag, each end portion of the fastening cords 47 has a length of about 30 cm.

For example, in the present embodiment, in the case where the covering member 31 has a width W of 1.4 m and the covering member 31 is attached to the support body, the inside width K of the covering member 31 is not less than 1.3 m. Here, since the fastening cord 47 has to have a length enough to fasten the covering member 31, each end portion of the fastening cord 47 preferably has a length of about 30 cm.

Incidentally, the material of the fastening cord 47 has no particular limitation except that it has a strength enough to fasten the bag so as to attach the bag (covering member 31) to the support body. In the present embodiment, a round cord which is generally used is used as the fastening cord 47.

To attach such a covering member to the support body, a buried-reinforcement-extraction-use equipment (hereinafter referred to as equipment) as fixture is preferably provided at a lower end of the support body such as an H-shaped steel. The equipment is provided with at least a matter exhibiting a shock absorbing effect, that is, a buffer.

By providing the equipment at the lower end of the support body, damage to the covering member caused by such an accident as that the covering member is caught on the end of the support body when the covering member is disposed on the support body thereby becoming torn is avoidable by virtue of the buffer effect of the equipment. As a result, the effect of the covering member, i.e., the facilitation of extraction of the support body, can be further improved.

By providing the equipment at the lower end of the support body, the lower end of the support body is not exposed, whereby the weight and pressure per unit area applied by the hydraulic composition such as cement composition to the lower end of the support body can be reduced. Therefore, it is possible to effectively avoid occurrence of damage to the covering member upon the driving of the same into a bore hole. Consequently, the effect of the covering member can be further improved.

The shape of the equipment has no particular restriction except that the shape allows the equipment to prevent the lower end of the support body from becoming exposed, and that the shape allows the equipment to serve as a buffer when it is disposed between the lower end of the support body and the covering material. However, the foregoing equipment preferably has such a shape that the equipment is fixed at the end of the support body by fitting.

Figure 9:
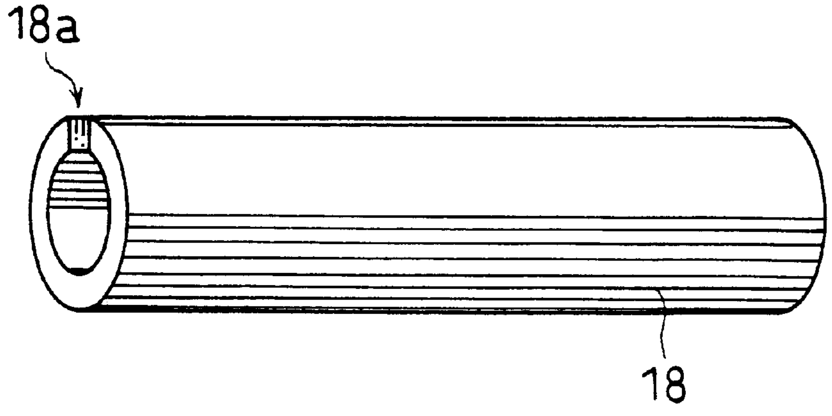
FIG. 9(*a*) is an explanatory view illustrating an arrangement of a buried-reinforcement-extraction-use equipment for use in an operation of fitting the sheet-like substrate on the support body.
Figure 9:
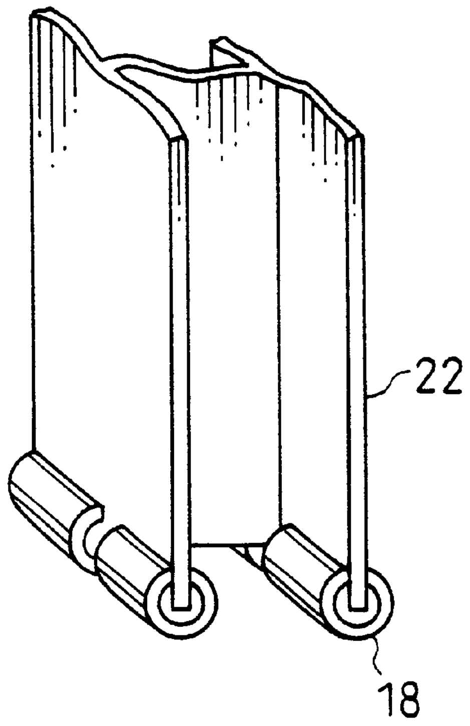

As such an equipment, for example, an equipment 18 which is formed in a cylindrical shape with a cut 18*a* as shown in FIG. 9(*a*) and which is made of at least a foamed material may be used. As shown in FIG. 9(*b*), the equipment 18 can be fixed to an H-shaped steel as the support body 22 by fitting an end of the H-shaped steel into the cut 18*a*. Therefore, it makes the fixing of the equipment 18 very easy, while it does not entail complication of the work of driving the support body 22 into a bore hole.

Incidentally, any one of various methods other than the fixing by fitting may be used as long as it neither makes the fixing operation complicated nor leads to an increase in the costs due to, for example, necessity of a specific facility for the fixing operation.

A material for the equipment has no particular restriction except that it is a material exhibiting a shock absorbing effect (buffer). The material may be: non-woven fabric such as split fiber non-woven fabric carpet, felt, or stitch bond non-woven fabric; fabric such as fiber fabric of flat yarn, cotton fabric, linen fabric, or fabric made of synthetic resin like polypropylene; foamed material obtained by forming closed cells or open cells in such a material as polystyrene, polyethylene, polypropylene, vinyl chloride resin, urethan resin, phenol resin, or rubber foam; elastomer such as urethan rubber, silicone rubber, fluoro-rubber, ether rubber, acrylic rubber, butyl rubber, neoprene (chloroprene rubber), butadiene-acrylonitrile copolymer, or natural rubber; or, natural material such as leather, wood, waterproofed paper, or thick paper.

Figure 2:
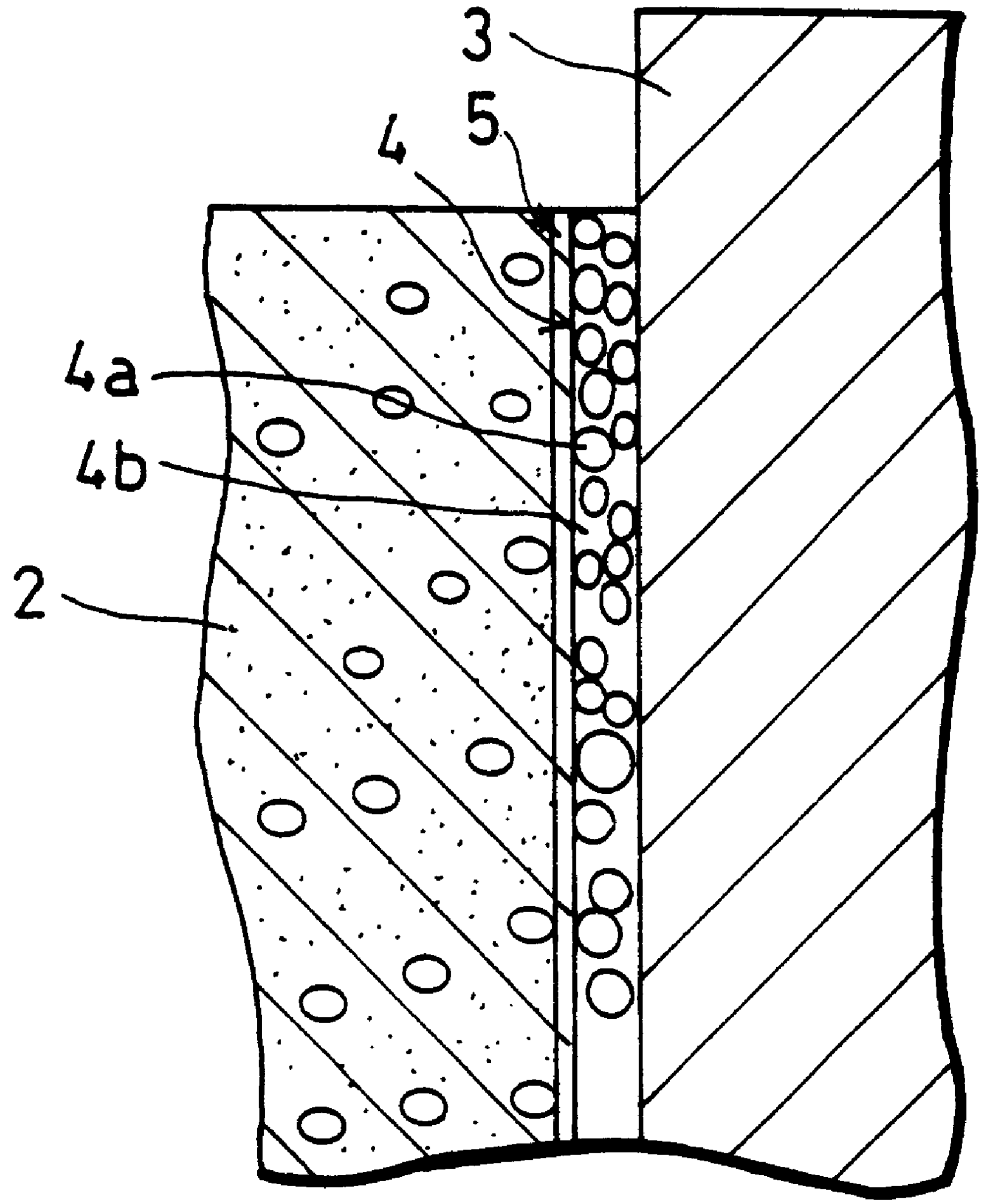
FIG. 2 is a cross-sectional view illustrating a principal part of the foregoing soil structure.

The following description will explain in more detail a method of construction of the structure in accordance with an embodiment of the present invention, while referring to FIGS. 1 and 2.

As shown in FIG. 1, a soil structure as a structure in accordance with the present embodiment is buried in soil foundation 1, and is composed of a hardened body of a hydraulic composition (hereinafter referred to as hydrated hydraulic composition) 2 and a support body 3. The soil structure is formed by, for example, either of the following manners: the support body 3 is loosely inserted into a bores hole 1*a* formed in the soil foundation 1 and subsequently the hydraulic composition is placed in around the support body 3 so that it is let to harden (hydrated) thereby becoming the hydrated hydraulic composition 2 as hardened body (hydrate) of the hydraulic composition; or, the support body 3 is buried into the hydraulic composition placed in the bore hole 1*a* and subsequently the hydraulic composition is let to harden so that the hydrated hydraulic composition 2 is formed. As an example of the hydraulic composition, cement composition may be cited.

Prior to the foregoing construction, a composition (A) layer 4 is formed on a surface of the support body 3 by evenly applying a composition (A) as a surface processing agent (adhesion preventive) thereon. Note that the support body 3 may be a support body covered with the covering member in accordance with the present invention. In this case, the support body is covered with a sheet-like substrate (i.e., covering member) with the composition (A) layer 4 formed thereon, which means that the composition (A) layer 4 is formed on a surface of the support body 3. In other words, the present invention requires only that the composition (A) layer 4 intervenes between the hardened hydraulic composition and the support body. Further, it is desirable that a waterproof coat 5 is formed on a surface of the composition (A) layer, for the aforementioned reason.

As shown in FIG. 2, the composition (A) layer 4 (coating film) is composed of a water-absorbent material, for example, water-swelling resin particles 4*a*, and an alkaline-water-soluble resin 4*b* as alkaline-water-soluble binder for causing the water-swelling resin particles 4*a* to the surface of the support body 3.

In the foregoing arrangement, the alkaline-water-soluble resin 4*b* of the composition (A) layer 4 is solved in alkaline water contained in the hydraulic composition when coming into contact therewith. On the other hand, the water-swelling resin particles 4*a* in the composition (A) layer 4 swell absorbing the alkaline water. Therefore, at the completion of the hardening (hydration) of the hydraulic composition, a layer of the water-swelling resin particles 4*a* which have swollen absorbing water is formed between the hydrated hydraulic composition 2 and the surface of the support body 3. Since the layer of water-swelling resin particles 4*a* which have swollen absorbing water is thus formed between the hydrated hydraulic composition 2 and the surface of the support body 3, the adhesion therebetween can be suppressed. With this, since the water-swelling resin particles 4*a* which have swollen exhibit the lubricating effect upon extraction of the support body 3 from the hydrated hydraulic composition 2, thereby causing the support body 3 to slip. As a result, labor (pulling force) required for the work of extracting the support body 3 from the hydrated hydraulic composition 2 can be further reduced, whereby the workability of the work can be improved. Furthermore, by drying the water-swelling resin particles 4*a*, a gap can be formed between the hydrated hydraulic composition 2 and the support body 3, whereby the workability of the foregoing work can be further improved. For this reason, the foregoing arrangement ensures to provide a surface processing agent (adhesion preventive) suitably applied to the soil structure (structure), a support body on which the surface processing agent is applied, a method for preventing adhesion between the support body and a hardened hydraulic composition, and a method for extracting the support body.

Figure 3:
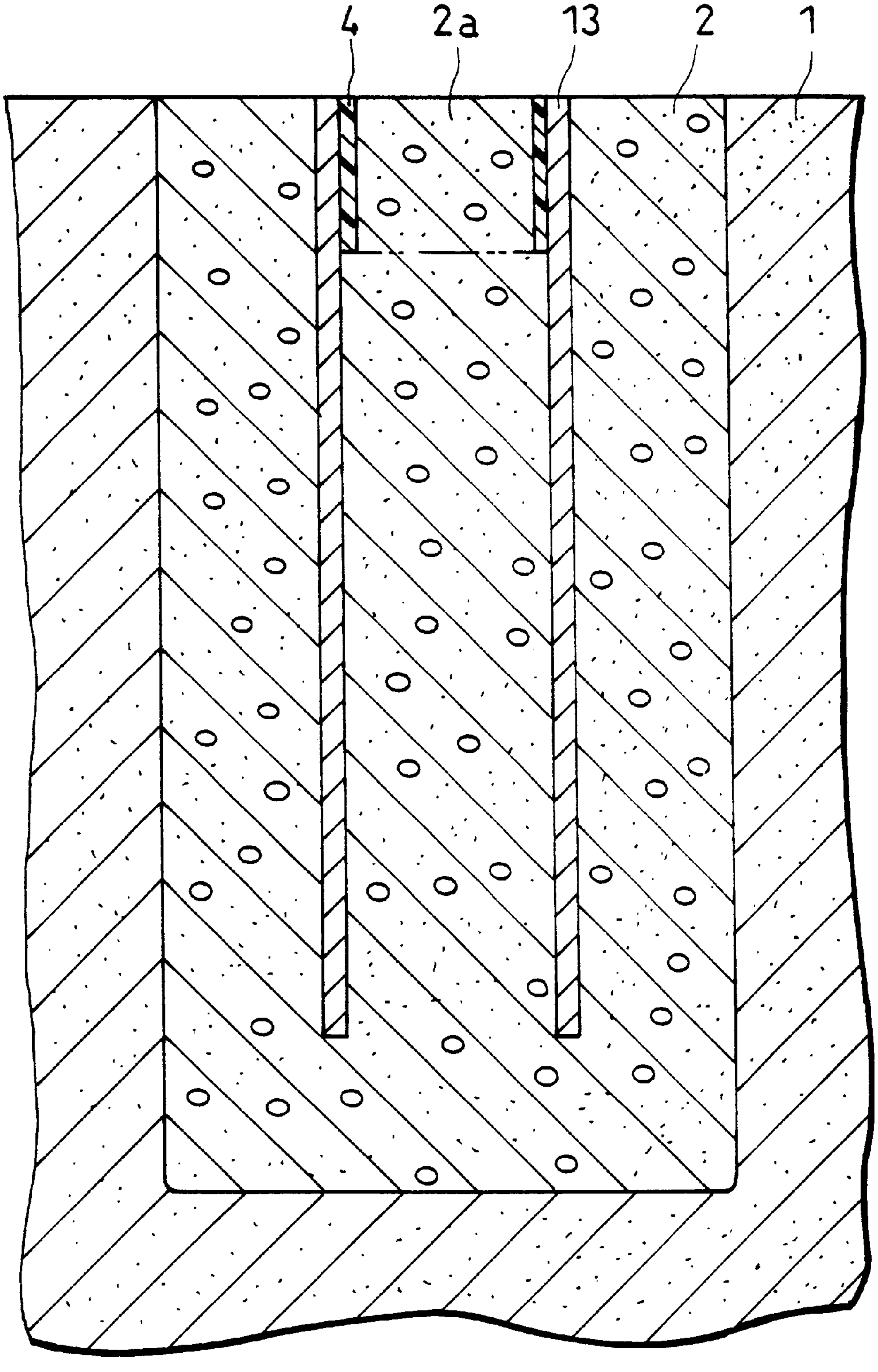
FIG. 3 is a cross-sectional view illustrating a schematic arrangement of a soil structure in accordance with another embodiment of the present invention.

The following description will explain in more detail a method of construction of the structure in accordance with another embodiment of the present invention, while referring to FIG. 3. Incidentally, the members having the same structure (function) as those shown in FIGS. 1 and 2 will be designated by the same reference numerals and their description will be omitted.

As shown in FIG. 3, the soil structure as the structure in accordance with the present embodiment is buried in the soil 1, composed of the hydrated hydraulic composition 2 and a support body 13 in a cylindrical shape. The foregoing soil structure may be constructed, for example, by burying the support body 13 in the hydraulic composition placed in the bore hole 1*a* and subsequently letting the hydraulic composition harden (hydrate) so that the hydrated hydraulic composition 2 is formed. The hydrated hydraulic composition 2 is formed inside the support body 13 as well. Further, prior to the construction, the composition (A) as surface processing agent (adhesion preventive) has been preparatorily uniformly applied on an upper part (corresponding to a pile head) of an inner surface of the support body 13, whereby the composition (A) layer 4 has been formed.

In the foregoing arrangement, the alkaline-water-soluble resin 4*b* in the composition (A) layer 4 dissolves in alkaline water contained in the hydraulic composition. On the other hand, the water-swelling resin particles 4*a* in the composition (A) layer 4 swell absorbing the alkaline water. Therefore, at the completion of the hardening (hydration) of the hydraulic composition, a layer of water-swelling resin particles 4*a* which have swollen absorbing water is formed between a pile head 2*a* of the hydrated hydraulic composition 2 and the inner surface of the support body 13. Since the layer of the water-swelling resin particles 4*a* which have swollen absorbing water is thus formed between the pile head 2*a* and the surface of the support body 13, the adhesion therebetween can be suppressed. With this, since the water-swelling resin particles 4*a* which have swollen exhibit the lubricating effect upon separation of the pile head 2*a* of the hydrated hydraulic composition 2 from the support body 13, thereby ensuring further reduction of labor and hence improving the workability of the work for separating the pile head 2*a* from the support body 13. Furthermore, by drying the water-swelling resin particles 4*a*, a gap can be formed between the pile head 2*a* and the inner surface of the support body 13, whereby the workability of the foregoing work can be further improved. For this reason, the foregoing arrangement ensures to provide a surface processing agent (adhesion preventive) suitably applied to the soil structure (structure), a support body which allows swift construction of the soil structure, and a method for preventing adhesion between the support body and a hardened body of a hydraulic composition.

Figure 4:
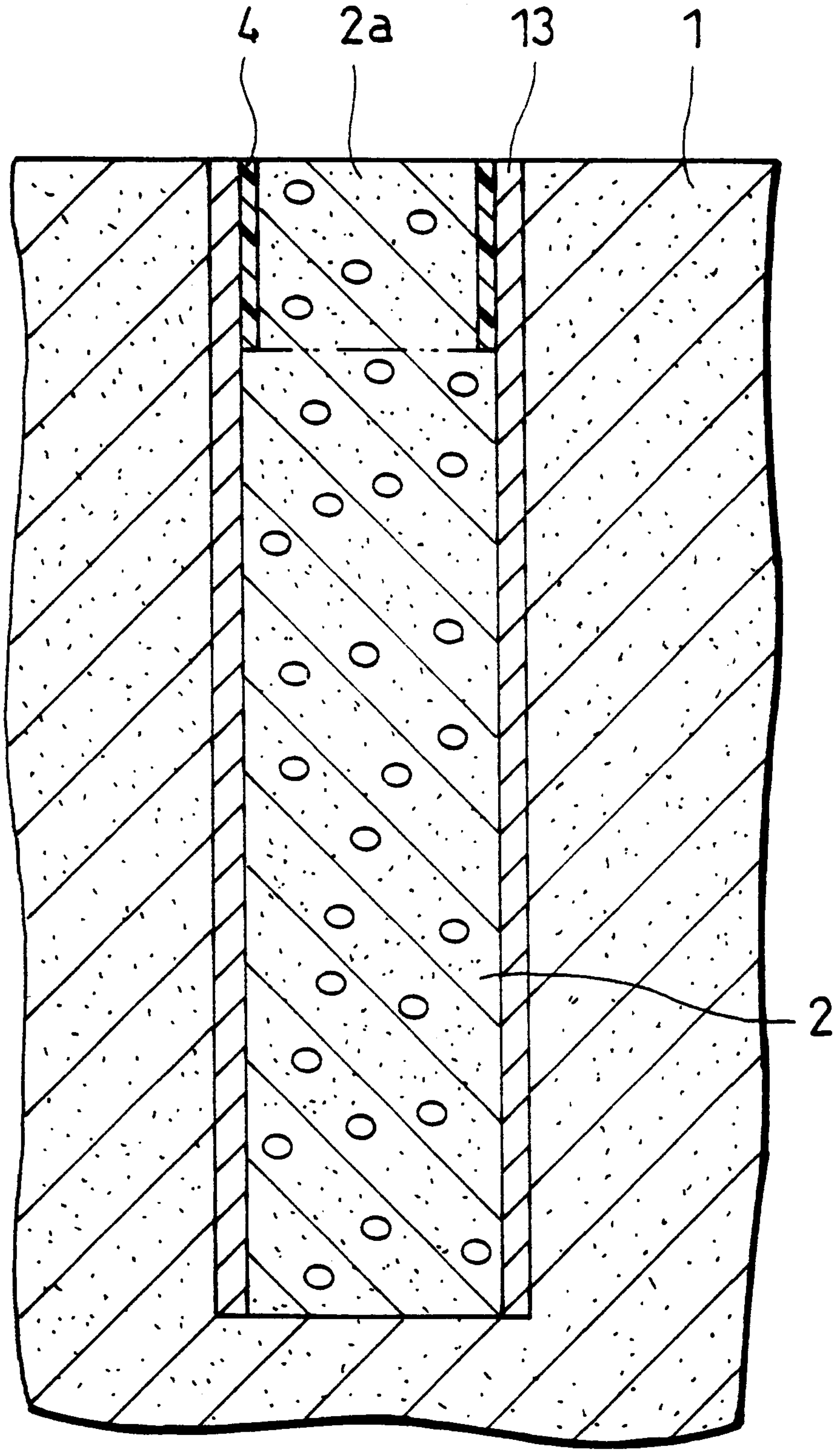
FIG. 4 is a cross-sectional view illustrating a schematic arrangement of a soil structure in accordance with still another embodiment of the present invention.

The following description will explain in more detail a method for constructing a structure in accordance with still another embodiment of the present invention, while referring to FIG. 4. Incidentally, the members having the same structure (function) as those shown in FIG. 3 will be designated by the same reference numerals and their description will be omitted.

As shown in FIG. 4, a soil structure as structure in accordance with the present embodiment is buried in the soil 1, composed of the hydrated hydraulic composition 2 and the tube-shaped support body 13. The foregoing soil structure may be constructed, for example, by inserting the support body 13 in the bore hole 1*a*, subsequently placing the hydraulic composition inside the support body 13 and letting the hydraulic composition harden (hydrate) so that the hydrated hydraulic composition 2 is formed. Further, prior to the construction, the composition (A) as surface processing agent (adhesion preventive) has been preparatorily uniformly applied on an upper part (corresponding to a pile head) of an inner surface of the support body 13, whereby the composition (A) layer 4 has been formed.

In the foregoing arrangement, since at the completion of the hardening (hydration) of the hydraulic composition, a layer of water-swelling resin particles 4*a* which have swollen is formed between a pile head 2*a* of the hydrated hydraulic composition 2 and the inner surface of the support body 13, adhesion therebetween can be suppressed. With this, since upon separation of the pile head 2*a* of the hydrated hydraulic composition 2 from the support body 13 the water-swelling resin particles 4*a* which have swollen suppress the adhesion therebetween, labor is reduced, and hence the workability of the work for separating the pile head 2*a* from the support body 13 can be improved. Furthermore, by drying the water-swelling resin particles 4*a*, a gap can be formed between the pile head 2*a* and the inner surface of the support body 13, whereby the workability of the foregoing work can be further improved. For this reason, the foregoing arrangement ensures to provide a surface processing agent (adhesion preventive) suitably applied to the soil structure (structure), a support body on which the surface processing agent is applied, and a method for preventing adhesion between the support body and a hardened body of a hydraulic composition.

The adhesion preventing method of the present invention may, as described above, be a method for preventing adhesion between a support body and a hardened body of a hydraulic composition, which includes a composition (A) layer providing step of providing a layer made of a composition (A) so as to intervene between the support body and the hardened body of the hydraulic composition. The composition (A) layer may be provided so as to intervene between the support body and the hardened body of the hydraulic composition, for example, by making the composition (A) adhere directly to the support body, or by wrapping the support body with a sheet-like member to which the composition (A) is adhered. The composition (A) layer may be formed by first preparing the composition (A) and then applying the composition (A) to the support body or the sheet-like member, or by simultaneously or alternately spraying a water-absorbent material and an alkaline-water-soluble resin directly to the support body or the sheet-like member so that the water-absorbent material and the alkaline-water-soluble resin are mixed right on the support body or the sheet-like member.

By the foregoing method, the alkaline-water-soluble resin dissolves upon contact with the alkaline water. More specifically, the alkaline-water-soluble resin in the composition (A) intervening between the support body and the hardened body of the hydraulic composition starts dissolving upon contact of the composition (A) with the hydraulic composition, whereby a layer of the water-absorbent material swelling by absorbing water is formed between the hardened body of the hydraulic composition and the support body. In other words, since a layer of the water-absorbent material which has swollen can be formed between the hardened body of the hydraulic composition and the support body, the adhesion therebetween can be further suppresses. With this, since the water-absorbent material which have swollen exhibits the lubricating effect upon extraction of the support body (buried reinforcement) from the hardened body of the hydraulic composition, thereby causing the support body (buried reinforcement) to slip. As a result, labor (pulling force) required for the work of extracting the support body (buried reinforcement) from the hardened body of the hydraulic composition can be further reduced, whereby the workability of the work can be improved. On the other hand, upon separation of a part of the hardened body of the hydraulic composition from the support body or separation of the support body from the hardened body of the hydraulic composition, the layer of the water-absorbent resin which has swollen absorbing water suppresses the adhesion therebetween, whereby labor required in the foregoing separation is reduced and hence the workability of the work for separating the hardened body of the hydraulic composition and the support body can be improved.

Therefore, the foregoing arrangement ensures improvement of the workability of the work of extraction of the support body from the hardened body of the hydraulic composition, as well as improvement of the workability of the work of separation between the hardened body of the hydraulic composition and the support body which is destined to be in contact with the hydraulic composition before hardening and to be separated from the hardened body of the hydraulic composition after hardening.

The adhesion preventive used in the foregoing adhesion preventing method in accordance with the present invention is, as described above, a surface processing agent adhered onto a surface of the support body or the sheet-like substrate (sheet-like member) to cover (wrap) the support body, which agent is composed of a water-absorbent material, preferably a water-swelling resin, and an alkaline-water-soluble resin having an acid value of not less than 15 mgKOH/g. The support body in accordance with the present invention is as described above obtained by making the composition (A) adhere (coat) as the foregoing adhesion preventive to a surface of the support body.

With the foregoing arrangement, the use of the foregoing adhesion preventive or support body allows a layer of the water-absorbent material having swollen to be formed between the hardened body of the hydraulic composition and the support body upon construction of the foregoing structure, thereby suppressing adhesion therebetween. As a result, this results in improvement of workability of the work of extraction of the support body from the hardened body of the hydraulic composition, or improvement of workability of the work of separation between the hardened body of the hydraulic composition and the support body which is destined to be in contact with the hydraulic composition before hardening and to be separated from the hardened body of the hydraulic composition after hardening. Therefore, the work of construction can be swiftly promoted.

Furthermore, according to the present invention, it is possible to form a gap between the hardened body of the hydraulic composition and the support body by drying the water-absorbent material, and this further improves the workability of the aforementioned works. Therefore, according to the foregoing arrangement, it is possible to provide an adhesion preventive (surface processing agent) which is suitably applicable to the structure. According to the foregoing arrangement, it is possible to provide a support body with which the structure is speedily constructed.

Furthermore, as the support body is extracted from the hydrate of the hydraulic composition, the resultant structure has a hollow (hole) whose shape is identical to the shape of the support body. The hollow can be, for example, used as a sewer. Alternatively, electric wires, gas pipes, water pipes and the like may be laid through the hollow.

Incidentally, the structure of the present invention may be a foundation on which a road sign or the like stands. More specifically, a support body formed to a size (shape, length, etc.) suitable for a buried section of a road sign to be provided is used to form a structure, and thereafter the support body is extracted while the road sign is fitted therein, so that the road sign is provided.

Furthermore, the method of extracting the support body in accordance with the present invention is, as described above, is a method for extracting the support body from the hardened body of the hydraulic composition, including the steps of (i) pouring the cement composition into a bore hole formed by boring the soil, (ii) preparing the support body by making the composition (A) adhere to a surface of the support body, or by covering the support body with a sheet-like member to which the composition (A) adheres, (iii) providing a layer of the composition (A) so as to intervene between the support body and the hardened body of the cement composition, by driving the support body prepared through said support body preparing step into the cement composition poured in the bore hole and letting the cement composition harden, and (iv) extracting the support body from the hardened body of the cement composition.

By the foregoing method, a layer of the water-absorbent material which has swollen absorbing water is formed between the hardened body of the cement composition and the support body (core). In other words, since a layer of the water-absorbent material which has swollen can be formed between the hardened body of the cement composition and the support body, the adhesion therebetween can be further suppressed. With this, since the water-absorbent material which have swollen exhibits the lubricating effect upon extraction of the support body from the hardened body of the cement composition, thereby causing the support body to (slip. As a result, labor (pulling force) required for the work of extracting the support body from the hardened body of the cement composition can be further reduced, whereby the workability of the work can be improved. Besides, the alkaline-water-soluble resin firmly adheres to the support body or the sheet-like subs-rate covering the support body, and hence, it serves to suppress loss of the water-absorbent material by falling off due to unexpected wet or precipitation (including acid rain) before or during the work of construction.

The foregoing effect is particularly remarkable in the case where the same support body is driven a plurality of times into the cement composition (reinsertion of support body is conducted), and leads to an excellent advantage of not impairing extractability of the support body.

Furthermore, by the foregoing method, it is possible to improve the workability of the work of extraction of the support body from the hardened body of the cement composition, or the workability of the work of separation between the hardened body of the cement composition and the support body which is destined to be in contact with the hydraulic composition before hardening and to be separated from the hardened body of the hydraulic composition after hardening. Therefore, the work of construction can be swiftly promoted.

The present invention provides an adhesion preventing method which facilitates separation between a hardened body of a hydraulic composition and a support body. In other words, the present invention provides an adhesion preventing method which facilitates the work of extraction or separation of a support body from a hardened body of a hydraulic composition, or the work of separation of a hardened body of a hydraulic composition from a support body, which raises the speed of work, improves the workability and the safety, and realizes reduction of costs.

To facilitate separation between the hardened body of the hydraulic composition and the support body, a maximum drawing strength of a composition composed of a water-absorbent material and a binder for helping adhesion of the water-absorbent material, or a sheet-like member on which such a composition is applied (hereinafter generally referred to as adhesion preventing member), should be not greater than 0.019 $kgf/cm^2$.

Furthermore, with a view to further facilitating separation between the hardened body of the hydraulic composition and the support body, the maximum drawing strength shown below is preferably not greater than 0.015 $kgf/cm^2$, more preferably not greater than 0.010 $kgf/cm^2$, further more preferably not greater than 0.005 $kgf/cm^2$, and particularly preferably not greater than 0.004 $kgf/cm^2$.

The present invention presents a desirable adhesion preventing member with a maximum drawing strength of not greater than 0.019 $kgf/cm^2$, which is either a composition (A) composed of an alkaline-water-soluble resin (binder) with an acid value of not less than. 15 mgKOH/g and a water-absorbent material (preferably a water-absorbent resin), or a sheet-like member (bag-shaped) to which the composition (A) adheres.

The use of the adhesion preventing member of the present invention whose maximum drawing strength is not greater than 0.019 $kgf/cm^2$ remarkably suppresses adhesion between the hardened body of the hydraulic composition and the support body, thereby facilitating separation therebetween (extraction of the support body) and hence improving the workability and the safety in work. By contrast, in the case where the maximum drawing strength exceeds 0.019 $kgf/cm^2$, excessive labor (pulling force) becomes required for separation of the support body from the hardened body of the hydraulic composition, and accordingly huger equipments related to the separation are required, thereby impairing the workability of the operator. Furthermore, labor required for separation of the hardened body (hydrate) of the hydraulic composition from the support body cannot be sufficiently reduced, and the workability of the work of separation of the hardened body of the hydraulic composition from the support body is not improved, either. In short, the separation of the hardened body of the hydraulic composition and the support body is often difficult.

The foregoing maximum drawing strength is obtained by the following procedure and formulas:

(1) First, an adhesion preventing member (test piece) is, depending on its form, applied or bonded to a surface of, or provided around, a 1 meter and 16.9 kg H-shaped steel of 100 mm (height)×100 mm (width)×6 mm (thickness)×8 mm (thickness) (100 mm (width)×100 mm (width)), which is reported on “KENSETSU BUKKA” (Construction Prices, monthly issued by KENSETSU BUKKA CHOSAKAI (Construction Prices Survey Association)). Note that here a new H-shaped steel with a smooth surface is used.

(2) Next, the foregoing H-shaped steel is perpendicularly buried at center in a bottomed cylindrical container which has an inner diameter of 250 mm and is filled with soil cement milk (hydraulic composition). The soil cement milk (hydraulic composition) contains water, cement, clay, bentonite which are mixed at a ratio by weight of 755:175:488:18, soil cement milk has been placed in the bore hole so as to have a depth of not less than 80 cm. Incidentally, deionized water, blast-furnace cement B type, clay produced at Sasaoka, and bentonite “SA-B” produced by SANRITSU KOGYO. are used as the foregoing water, cement, clay, and bentonite, respectively.

(3) Subsequently, it is left for 7 days, and after hardening of the soil cement, the 1 meter H-shaped steel is extracted therefrom. A maximum force required for the extraction (referred to as maximum drawing load) is measured.

(4) A value of the maximum drawing load is divided by an area in which the H-shaped steel is in contact with the hardened cement, so that the maximum drawing strength is found.

$$\text{MAXIMUM DRAWING STRENGTH } (kgf/cm^2) = \frac{\text{MAXIMUM DRAWING LOAD (kgf)}}{\text{CONTACT AREA OF H-SHAPED STEEL AND HARDENED CEMENT}}$$

Incidentally, the adhesion preventing member (test piece) is provided on the surface of the 1 meter H-shaped steel in the following manner.

(i) In the case where the adhesion preventing member is in a liquid state (paste, dispersion, or viscose state), the adhesion preventing member, 160 $g/m^2$ in a dry state, is uniformly applied directly to the surface of the H-shaped steel.

(ii) In the case where the adhesive preventing member is in a sheet form suitable for being bonded, the adhesion preventing member is bonded to a surface of the H-shaped steel with use of a binder such as adhesive or pressure sensitive adhesive.

(iii) In the case where the adhesive preventing member is in a sheet form suitable for wrapping, it is processed into a bag shape or a cylindrical shape if necessary so as to wrap the H-shaped steel. Incidentally, in the case where the adhesion preventing member is obtained by application of an adhesion preventive composition to a sheet-like substrate and an amount of the same per unit area can be set as desired, an adhesion preventive member to which the adhesion preventive composition of 160 $g/m^2$ in a dry state is evenly applied is used. Furthermore, in the case where an amount per unit area of an adhesion preventive composition of a test piece used in the maximum drawing strength measurement is unknown or the amount of the adhesion preventive composition of the same cannot be freely set, the test piece per se is used in the measurement. Furthermore, in the case where an H-shaped steel is wrapped with the adhesion preventing member (sheet-like member), the H-shaped steel is wrapped with a single layer of an adhesion preventing member, not a multilaminated layer of the adhesion preventing member (the adhesion preventing member should not be laminated on one another).

The adhesion preventing member of the present invention is made of at least a water-absorbent material and a binder for causing the water-absorbent material to adhere to the support body or the sheet-like substrate, and is to be provided between the hydraulic composition and the support body so as to reduce the adhesion between the hardened body of the hydraulic composition and the support body, and further, it is characterized in that the maximum drawing strength is not more than 0.019 $kgf/cm^2$.

Furthermore, from the viewpoint of prevention of adhesion, the foregoing adhesion preventing member further characterized in that the water-absorbent material is a water-absorbent resin is preferable. Furthermore, the foregoing adhesion preventing member further characterized in that the binder is an alkaline-water-soluble resin is preferable.

The following description will more concretely explain the present invention showing examples, though the present invention is not limited to the same.

In the case where a sample was an alkaline-water-soluble resin monomer, the acid value of the alkaline-water-soluble resin was measured according to a testing method described in the item 4.3 of JIS K6901 "Liquid Unsaturated Polyester Resin Testing Method." In the case where, however, the alkaline-water-soluble resin does not dissolve in a solvent provided in the testing method, an appropriate solvent dissolving the same was used and the measurement was carried out according to the foregoing testing method. In the case where the sample was a mixture of the alkaline-water-soluble resin and the water-absorbent material, or a coating film made of the same, the sample was first dissolved or dispersed in an organic solvent, and it was filtered so that a filtrate dissolving the alkaline-water-solvent resin therein is separated from the water-absorbent material. Then, the filtrate thus obtained was subjected to measurement according to the testing method described in the item 4.3 of JIS K6901 "Liquid Unsaturated Polyester Resin Testing Method." Note that a weight of non-volatile components obtained by drying the filtrate was regarded as the total amount of the alkaline-water-solvent resin.

Differential scanning calorimetry of the alkaline-water-soluble resin was carried out: by using DSC220C. produced by SEIKO ELECTRIC CO., LTD. The conditions for the measurement were as follows. In nitrogen atmosphere, 10 mg of the sample was heated to 150° C. and kept at the same temperature for 5 minutes. Thereafter it was rapidly cooled to −100° C. and was kept at the same temperature for 5 minutes. Subsequently, the sample was heated at a rate of 10° C. per minute to 150° C. Then, temperatures corresponding to points of inflection in a DSC curve were found by the conventional procedure, which were regarded as glass transition temperatures of the alkaline-water-soluble resin.

EXAMPLE 1

The water-swelling resin (water-absorbent material) was prepared in the following manner. A desk-top-type jacketed kneader with a capacity of 1.5 L, which was equipped with a thermometer and a blade (agitating element) and whose inner surface was lined with ethylene trifluoride, was used as a reactor, and 55.18 g of methoxypolyethylene glycol methacrylate (molecular weight: 512), 3.76 g of methacrylic acid (molecular weight: 86.09), 215.69 g of sodium methacrylate (molecular weight: 108), 1.4 g of polyethylene glycol diacrylate as cross-linking agent, and 352.37 g of deionized water as solvent were placed in the reactor. A proportion of the cross-linking agent in the monomer components is 0.15 mole percent.

By flowing warm water of 50° C. through the jacket, the foregoing aqueous solution, being stirred under nitrogen gas flow, was heated to 50° C. Subsequently, 10 g of 11.6 wt % solution of 2,2'-azobis-(2-amidinopropane) dihydrochloride (molecular weight: 271.27, product V-59 produced by Wako Pure Chemical Industries, Ltd.) as polymerization initiator was added thereto, and the resultant solution was stirred for 10 seconds. Then, the stirring was stopped and the solution was left at rest. A ratio of the polymerization initiator with respect to the monomer components was 0.2 mole percent.

Upon addition of the polymerization initiator, polymerization immediately started, and an inside temperature reached 100° C. (peak temperature) after 90 minutes elapsed. Thereafter, the content was matured for 30 minutes with warm water of 80° C. flown through the jacket. As a result, water-containing gel was obtained. After completion of the reaction, these blade was rotated so as to crush the water-containing gel into a fine state, and thereafter the reactor is turned around so that the water-containing gel is taken out.

The water-containing gel thus obtained was dried at a temperature of 140° C. for three hours by a drier with internal air circulation. After drying, the dried substance was pulverized by a desktop grinder (produced by KYORITSU RIKO). As a result, a water-swelling resin with a mean particle diameter of 150 μm was obtained.

On the other hand, an alkaline-water-soluble resin (alkaline-water-soluble binder) was prepared in the following manner. 0.45 kg of acrylic acid, 2.4 kg of ethyl acrylate, 0.15 kg of methyl methacrylate, 12 g of 2,2'-azobis-(2,4-dimethyl valeronitryl) as polymerization initiator, and 3 kg of methyl alcohol as solvent were placed in a vessel-type reactor with a capacity of 50 L, which was equipped with a thermometer, an agitating element, a reflux condenser, and a dropping device. Into the dropping device, a mixture solution of 1.05 kg of acrylic acid, 2.1 kg of methyl acrylate, 3.85 kg of methyl methacrylate, 28 g of 2,2'-azobis-(2,4-dimethyl valeronitryl), and 7 kg of methyl alcohol was placed.

The methyl alcohol solution was stirred and heated to 65° C. for reaction in an atmosphere of nitrogen gas for 20 minutes. In so doing the ratio of polymerization of the content was adjusted to 72 percent. Subsequently, the mixture solution in the dropping device was dropped constantly in a manner such that it took 2 hours, while the temperature inside was kept to 65° C. After the dropping finished, the content was matured at a temperature of 65° C. for three hours. After completion of reaction, 10 kg of methyl alcohol was mixed into the content, so that 33 wt % methyl alcohol solution of alkaline-water-soluble resin was obtained.

The alkaline-water-soluble resin thus obtained had an acid value of 117 mgKOH/g. Furthermore, as a result of differential scanning calorimetry of the alkaline-water-soluble resin, the alkaline-water-soluble resin had two glass transition temperatures in a range of −80° C. to 120° C. More concretely, it had two glass transfer temperatures of 14.4° C. and 57.9° C.

50 parts by weight of the water-swelling resin prepared as described above and 150 parts by weight of the 33 wt %. methyl alcohol solution of the alkaline-water-soluble resin prepared as described above were mixed and dispersed, resulting in that a dispersed mixture solution of a composition (A) with a maximum drawing strength of 0.0037 $kgf/cm^2$ in accordance with the present invention was obtained as a surface processing agent (adhesion preventive). A ratio by weight of the water-swelling resin to the alkaline-water-soluble resin in the dispersed mixture solution (water-swelling resin/alkaline-water-soluble resin) was 1/1. The dispersed mixture solution thus obtained was uniformly applied on a surface of the H-shaped steel of 200 mm (width)×200 mm (height)×500 mm (length) (10 mm in thickness of steel). With this, the composition (A) layer (coating film) which was not prone to exfoliation, damage, and stickiness was formed. The coating film firmly adhered to the H-shaped steel, and it did not easily exfoliate even when being scratched with an iron spatula.

On the other hand, a mortar was prepared as hydraulic composition by mixing 135 parts by weight of river sand and 100 parts by weight of water into 55 parts by weight of cement, and the mortar was placed in a bore hole bored to a depth of 400 mm. Subsequently, an H-shaped steel was perpendicularly buried in the mortar thus placed so that a buried length or the H-shaped steel was 400 mm. Then, the mortar was hydrated.

After 7 days elapsed, the H-shaped steel was extracted from the hydrate of the mortar by using a tensile tester. The H-shaped steel was easily extracted from the hydrate of mortar, with a layer of the water-swelling resin having swollen absorbing water being formed on the surface of the H-shaped steel. A maximum adhesion strength of the H-shaped steel and the hydrate of mortar, calculated from a pulling force required in the work of extraction, was 0.01 $kg/cm^2$. Accordingly, the following was found: by applying the dispersed mixture solution on the surface of the H-shaped steel, the adhesion between the H-shaped steel and the hydrate of mortar was suppressed, whereby the workability was improved.

EXAMPLE 2

The alkaline-water-soluble resin (alkaline-water-soluble binder) was prepared in the following manner. 0.525 kg of acrylic acid, 1.725 kg of methyl acrylate, 2.4 kg of ethyl methacrylate, 2.85 kg of methyl methacrylate, 30 g of 2,2'-azobis-(2,4-dimethyl valeronitryl), and 15 kg of methyl alcohol were placed in a vessel-type reactor with a capacity of 50 L, which was equipped with a thermometer, an agitating element, a reflux condenser, and a dropping device.

The methyl alcohol solution was stirred and heated to 65° C. for reaction in nitrogen atmosphere for 5 hours. In so doing, 33 wt % methyl alcohol solution of alkaline-water-soluble resin was obtained. The alkaline-water-soluble resin thus obtained had an acid value of 51 mgKOH/g.

150 parts by weight of the 33 wt % methyl alcohol solution of the alkaline-water-soluble resin thus prepared as described above and 50 parts by weight of the water-swelling resin prepared as described in the description of Example 1 were mixed and dispersed, resulting in that a dispersed mixture solution of a composition (A) with a maximum drawing strength of 0.005 $kgf/cm^2$ in accordance with the present invention was obtained as a surface processing agent (adhesion preventive).

By using the dispersed mixture solution thus obtained, a maximum adhesion strength of the H-shaped steel and the hydrate of mortar was found under the conditions identical to those for Example 1. As a result, the maximum adhesion strength was 0.016 $kg/cm^2$. Therefore, by applying the dispersed mixture solution on the surface of the H-shaped steel, the adhesion between the H-shaped steel and the hydrate of mortar was suppressed, whereby the workability was improved.

EXAMPLE 3

10 parts by weight of the water-swelling resin and 273 parts by weight of the 33 wt % methyl alcohol solution of the alkaline-water-soluble resin (acid value: 117 mgKOH/g), which were prepared in respective manners identical to those described in the description of Example 1, were mixed and dispersed, resulting in that a dispersed mixture solution of a composition (A) in accordance with the present invention was obtained as a surface processing agent (adhesion preventive). A water-swelling resin/alkaline-water-soluble resin ratio of the foregoing dispersed mixture solution was 1/9. A dispersed mixture solution obtained was uniformly applied on surface of Standard Test Plate (JIS G 3141 (SPCC-SB)), a 70 mm (width)×150 mm (length)×0.8 mm (thickness) piece of cold-rolled steel plate (support body; produced by JAPAN TEST PANEL OSAKA). As a result, a composition (A) layer (coating film) was formed on the steel plate so that an amount of the composition (A) adhering per unit area (adhesion amount) became 100 $g/m^2$ (hereinafter referred to as test piece).

Next, 25 wt % methyl alcohol solution of the alkaline-water-soluble resin prepared in the manner described in the description of Example 1, as water resistance applying agent in accordance with the present invention, was uniformly applied on the surface of the foregoing coating film so that an adhesion amount became 50 $g/m^2$.

The water resistance of the waterproof coat thus obtained was evaluated. More specifically, the test piece (the test piece on which the composition (A) layer and the waterproof coat were formed, which is hereinafter referred to as test piece a) was soaked in deionized water, and change of the coating film with time was subjected to visual inspection so that the water resistance of the waterproof coat was evaluated. In the case where it is inferior in water resistance, the deionized water penetrates the waterproof coat and causes the water-swelling resin contained in the coat to swell, thereby causing some portions of the coating film to appear white since having become loose. Therefore, the water resistance was evaluated with the following four grades: "excellent" indicating that portions appearing white account for less than 10 percent in the whole area of the coating film; "good" indicating that such portions account for not less than 10 percent and less than 40 percent; "fair" indicating that such portions account for not less than 40 percent and less than 80 percent; and "poor" indicating that such portions account for not less than 80 percent.

Likewise, water resistance of a test piece on which only the waterproof coat was formed (hereinafter referred to as test piece b), and that of a test piece on which only the coating film was formed (hereinafter referred to as test piece c) were evaluated. The results are shows in Table 1 below.

TABLE 1

| | WATER RESISTANCE | | | | | |
|---|---|---|---|---|---|---|
| | 5 MIN. | 30 MIN. | 3 HRS. | 4 HRS. | 5 HRS. | 7 HRS. |
| TEST PIECE a | EXCELLENT | EXCELLENT | EXCELLENT | GOOD | GOOD | GOOD |
| TEST PIECE b | EXCELLENT | EXCELLENT | EXCELLENT | EXCELLENT | EXCELLENT | EXCELLENT |
| TEST PIECE c | FAIR | — | — | — | — | — |

As clear from the results shown in Table 1, the test pieces a and b were evaluated as "excellent" or "good" even after 7-hour soak in deionized water since the waterproof coat was formed on each, showing that they excelled in water resistance. In other words, the waterproof coat excelled in water resistance. Further, it was also found that the alkaline-water-soluble resin of the present example excelled in water resistance, and no exfoliation of a coating film made of the same occurred in the case where the coating film became wet with water. By contrast, regarding the test piece c, without a waterproof coat formed thereon, some portions of the water-swelling resin contained in the coating film were exposed, and the evaluation of water resistance thereof was "fair" as a result of only five-minute soak in deionized water, showing that it was inferior in water resistance as compared with the case where the waterproof coat was formed. Incidentally, however, the foregoing evaluation concerned a proportion of portions of the coating film appearing white, and no exfoliation of the composition (A) layer occurred. Thus, the inferiority was not such that would cause a problem in practical application.

Next, the test piece a was perpendicularly buried in the mortal prepared in the manner described in the description of Example 1 so that a 13 mm portion thereof is buried, and the mortal was let to hydrate. After 7 days elapsed, the test piece a was extracted from the mortar, and a drawing load in the work of extraction was measured, while a width of a hole formed as a result of extraction of the test piece a was measured.

Likewise, as to a test piece on which wax available at stores was applied to a thickness of 150 μm (hereinafter referred to as test piece d), a test piece on which the same wax was applied to a thickness of 400 μm (hereinafter referred to as test piece e), and a test piece on which nothing was applied (hereinafter referred to as blank test piece), respective drawing loads were measured. The results are shown in Table 2 below.

TABLE 2

| | DRAWING LOAD (kgf) | WIDTH OF HOLE (mm) |
|---|---|---|
| TEST PIECE a | 6.8 | 2.7 |
| TEST PIECE d | 11.7 | 0.85 |
| TEST PIECE e | 13.2 | 1.2 |
| BLANK TEST PIECE | NOT EXTRACTED (>53) | — |

The test piece a could be easily extracted from the hydrate of mortar. Further, a layer of water-swelling resin having swollen was formed on a surface of the test piece a, whereby the hole formed as a result of extraction of the test piece a had a much greater width as compared with a thickness of the test piece a. On the other hand, the test pieces d and e were extracted from the hydrate of mortar with about twice the drawing load required for extraction of the test piece a. The blank test piece could not be extracted from the hydrate of mortar even with a drawing load of 53 kgf. In other words, from the results shown in Table 2, it was found that the dispersed mixture solution applied to a surface of the test piece a successfully suppressed adhesion between the test piece a and the hydrate of mortar, thereby improving the workability, as well as that the provision of such a waterproof coat on the surface of the coating film did not impair the workability at all.

EXAMPLE 4

The water-swelling resin (mean particle diameter: 150 μm) and the 33 wt % methyl alcohol solution of the alkaline-water-soluble resin, which were respectively prepared in a manner described in the description of Example 1, were mixed and dispersed at respective ratios by weight (proportions) shown in Table 3 below, resulting in that dispersed mixture solutions were obtained as surface processing agents in accordance with the present invention. In other words, two types of dispersed mixture solutions as surface processing agents (adhesion preventives) in accordance with the present invention and one type of a dispersed mixture solution for comparison were obtained.

The dispersed mixture solutions thus obtained were uniformly applied by brushing to surfaces of H-shaped steels as support bodies (buried reinforcements) of 100 mm (width)× 100 mm (height)×1 m (length) (10 mm in thickness of steel) each so that adhesion amounts shown in Table 3 are obtained, respectively, and were dried one night so that respective coating films were obtained. The coating films firmly adhered to the H-shaped steels, and they did not easily exfoliate even when being scratched with an iron spatula or the like.

Subsequently, the foregoing H-shaped steels (totally eight in number, which are H-shaped steels (1) through (6), a comparison-use H-shaped steel, and a blank) were respectively inserted at centers of Bottomed void tubes made of paper with an inner diameter of 250 mm each (produced by SHOWA MARUDUTSU, trade name: SONOVOID). The bottom of each void tube was formed by closing an opening of the tube with a vinyl bag. As to one of the foregoing H-shaped steels, 25 wt % methyl alcohol solution of the alkaline-water-soluble resin prepared in the manner described in the description of Example 1, as water resistance applying agent in accordance with the present invention, was uniformly applied on the surface of the H-shaped steel so that an adhesion amount thereof became as shown in Table 3. By so doing, the waterproof coat was formed.

On the other hand, a cement composition (hereinafter referred to as cement composition A) as a hydraulic composition was prepared by formulating water, cement, clay, and bentonite at a ratio by weight of 52.6:12.2:34:1.2. Then, the cement composition A was placed in the foregoing void tubes so that the H-shaped steels (totally seven in number, which are the H-shaped steels (1) through (5), the comparison-use H-shaped steels, and the blank) thus inserted thereto were buried to a depth of 900 mm each. On the other hand, another cement composition (1:2 mortar, hereinafter referred to as cement composition B) as hydraulic composition was prepared by formulating water, cement, and Toyoura standard sand at a ratio (ratio by weight) of 6:10:20. The cement composition B was placed in the void tube of the H-shaped steel ( H-shaped steel (6)) so that the steel was buried to a depth of 900 mm. Thereafter, the cement compositions A and B were hydrated.

One week later, the H-shaped steels were extracted from the hydrates of the cement compositions A and B by use of a tensile tester in a state where the cement compositions A and B were fixed. Here, respective pulling forces (hereinafter referred to as maximum forces) required in the works of extraction were measured. The conditions for the measurement (ratio by weight, adhesion amount) and results of the measurement are shown in Table 3 below. Figures indicative of the maximum forces include weights of the H-shaped steels.

On the other hand, 50 wt % methyl alcohol solution of an alkaline-water-soluble resin (alkaline-water-soluble binder) was prepared. The alkaline-water-soluble resin was obtained by copolymerizing monomer components which contain methyl acrylate, ethyl acrylate, acrylic acid, and methyl methacrylate at a ratio of 18:34:15:33 (percent by weight) under the same conditions as those for the preparation of the alkaline-water-soluble resin of Example 1. The alkaline-water-soluble resin thus obtained had an acid value of 115 mgKOH/g. As a result of the differential scanning calorimetry of the alkaline-water-soluble resin, the alkaline-water-soluble resin had two peaks in a range of −80° C. to 120° C.

The 50 wt % methyl alcohol solution of the alkaline-water-soluble resin and the water-swelling resin, prepared as described above, were mixed at a ratio by dry-state weight of 80:80, whereby a resin solution (dispersed mixture solution) to be formed into a resin layer, i.e., a composition (A) layer was obtained.

The resin solution was applied on a surface of one side of a polyester-cotton blended yarn fabric with a thickness of 0.4 mm, a basic weight of 150 $g/m^2$, and a tensile strength of 31 kgf/25 mm, in which polyester and cotton were blended at a ratio by weight of 65:35, and the fabric was dried, whereby the composition (A) layer (resin layer) was formed thereon. Adhesion amounts of the alkaline-water-soluble resin and the water on the fabric were 80 $g/m^2$ and 80 $g/m^2$, respectively.

Subsequently, the fabric was sewn so that a 350 mm (width)×1,200 mm (height) bag-shaped member (covering member) with a maximum drawing strength of 0.0033 $kgf/cm^2$ was formed with the composition (A) layer coming inside.

Subsequently, a 100 mm (width)×100 mm×1 m (length) H-shaped steel was wrapped with the foregoing bag-shaped member by inserting the H-shaped steel therein. Here, the

TABLE 3

| H-SHAPED STEELS | SURFACE PROCESSING AGENT RATIO BY WEIGHT* | SURFACE PROCESSING AGENT ADHESION AMOUNT ($g/m^2$) | WATERPROOF COAT ADHESION AMOUNT ($g/m^2$) | CEMENT COMPOSITION | MAXIMUM FORCE (kgf) ** |
|---|---|---|---|---|---|
| (1) | 1:1 | 50 | — | A | 228 |
| (2) | 1:1 | 100 | — | A | 66 |
| (3) | 1:1 | 200 | — | A | 19 |
| (4) | 1:9 | 100 | — | A | 223 |
| (5) | 1.1 | 100 | 50 | A | 56 |
| (6) | 1:1 | 200 | — | B | 197 |
| COMPARISON-USE | ONLY ALKALINE-WATER-SOLUBLE RESIN | 100 | — | A | *** (>300) |
| BLANK | N/A (AGENT-NON-APPLIED H-SHAPED STEEL) | | — | A | *** (>300) |

*RATIO BY WEIGHT indicates each ratio by weight of water-swelling resin:alkaline-water-soluble resin.
**MAXIMUM FORCE includes each weight of the H-shaped steels.
***Beyond the limit of the measurement.

EXAMPLE 5

A water-swelling resin (water-absorbent material) was formed by cross-linking-copolymerizing sodium acrylate and acrylic acid under predetermined conditions. The water-swelling resin had a mean particle diameter of 100 μm.

composition (A) layer came on an inner side of the bag-shaped member facing the H-shaped steel.

On the other hand, water, cement, clay, and bentonite were mixed at a ratio by weight of 755:175:48:18, whereby soil cement milk (hydraulic composition) was prepared.

Subsequently, the soil cement milk was poured into a 1-meter-deep container, and the H-shaped steel wrapped with the bag-shaped member was driven into the soil cement milk. Immediately thereafter, the entire H-shaped steel was extracted therefrom, and the H-shaped steel was again driven into the soil cement milk (reinsertion). This action of reinsertion was repeated 60 times, to produce conditions which likely cause forcible exfoliation of the composition (A) layer, and the H-shaped steel was finally driven into the soil cement milk and left at rest. Incidentally, when the foregoing 100 mm (width)×100 mm×1 m (length) H-shaped steel was wrapped with the bag-shaped member, the bag-shaped member was sometimes caught by sharp corners of the H-shaped steel, but the bag-shaped member was hardly damaged.

7 days after the final driving of the H-shaped steel into the soil cement milk, the H-shaped steel was extracted from the soil cement (i.e., a hardened body of the soil cement milk) by using a tensile tester. A drawing load in the work of extraction was 17 kgf (0.0034 kgf/cm$^2$), which means that the H-shaped steel was extracted from the hardened body of the soil cement milk with great ease.

EXAMPLE 6

The same fabric obtained in Example 5 was sewn so that a bag-shaped member (covering member) with a maximum drawing strength of 0.0047 kgf/cm$^2$ was formed with the composition (A) layer coming outside, and the same operations as those of Example 5 were conducted except that the composition (A) layer was provided outside the bag-shaped member so as to be in direct contact with the soil cement milk. Incidentally, when the foregoing 100 mm (width)×100 mm×1 m (length) H-shaped steel was wrapped with the bag-shaped member, the bag-shaped member was sometimes caught by sharp corners of the H-shaped steel, but the bag-shaped member was hardly damaged.

7 days after the final driving of the H-shaped steel into the soil cement milk, the H-shaped steel was extracted from the soil cement, with a drawing load in the work of extraction of 30 kgf (0.006 kgf/cm$^2$). In the present example, the drawing load more or less increased as compared with the case of Example 5, but the H-shaped steel was still extracted from the hardened body of the soil cement milk with ease.

EXAMPLE 7

A coat loss test for measuring a loss ratio regarding the covering member in accordance with the present invention, that is, a coat loss test for measuring a loss ratio of polymer adhering to a fabric (hereinafter referred to as loss test) was conducted. First, according to the formulation and method described in the description of Example 5, the following three types of samples were prepared as samples to be subjected to the loss test. Incidentally, the polymer in the present example is defined as mixture of the alkaline-water-soluble resin (alkaline-water-soluble binder) and the water-swelling resin (water-absorbent material).

Sample 1: the alkaline-water-soluble resin and the water-swelling resin was made to adhere (to one surface of a fabric) so that their adhesion amounts were 80 g/m$^2$ and 80 g/m$^2$, respectively.

Sample 2: the alkaline-water-soluble resin and the water-swelling resin was made to adhere (to one surface of a fabric) so that their adhesion amounts were 25 g/m$^2$:75 g/m$^2$, respectively.

Sample 3: starch was used in the place of the alkaline-water-soluble resin, and was made to adhere (to one surface of a fabric) so that its adhesion amount was 80 g/m$^2$.

Then, the foregoing three samples 1–3 were cut to a size of 5 cm×5 cm each, and were soaked for 5 minutes in deionized water in containers with each capacity of 100 ml. Then, they were taken out of the deionized water, and after removing unnecessary water, they were dried up.

Subsequently, from changes in the weights of the samples from before soak in deionized water to after soak (drying up), amounts of polymer having been lost from the fabric, and the amount (g) of the polymer having been lost was divided by the total amount (g) of the polymer adhering to the fabric before soak in deionized water so that the loss ratio (%) was calculated. In other words, the loss ratio was calculated by the following formula:

$$\text{LOSS RATIO (\%)} = \frac{\text{SAMPLE WEIGHT BEFORE SOAK (g)} - \text{SAMPLE WEIGHT AFTER SOAK (g)}}{\text{SAMPLE WEIGHT BEFORE SOAK (g)} - \text{WEIGHT OF FABRIC (g)}} \times 100$$

As a result, the loss ratios of the foregoing samples 1–3 were 25.4%, 60.2%, and 70.9%, respectively. From this result, it was found that Sample 1 in which the alkaline-water-soluble resin (alkaline-water-soluble binder) and the water-swelling resin (water-absorbent material) were formulated at a ratio of 50:50 exhibited the loss ratio of not more than 50 percent, which means that Sample 1 further excelled in prevention (suppression) of loss of the water-swelling resin (water-solvent material) from a fabric (sheet-like substrate) before or during the work of construction.

EXAMPLE 8

12.5 wt % methyl alcohol solution of an alkaline-water-soluble resin (alkaline-water-soluble binder) was prepared. The alkaline-water-soluble resin was obtained by copolymerizing monomer components which contained methyl acrylate, ethyl acrylate, acrylic acid, and methyl methacrylate at a ratio of 18:34:15:33 (percent by weight) under the same conditions as those for the preparing method described in the description of Example 1. The alkaline-water-soluble resin obtained had an acid value of 115 mgKOH/g. As a result of the differential scanning calorimetry of the alkaline-water-soluble resin, the alkaline-water-soluble resin had two peaks in a range of −80° C. to 120° C.

On the other hand, a water-swelling resin (water-absorbent material) was prepared by cross-linking-copolymerizing sodium acrylate and acrylamide under predetermined conditions. The water-swelling resin thus obtained had a mean particle diameter of 200 $\mu$m.

12.5 wt % methyl alcohol solution of the alkaline-water-soluble resin prepared as described above and the forgoing water-swelling resin were mixed at a ratio by dry-state weight of 10:1, whereby a resin solution (dispersed mixture solution) to be formed into a resin layer, i.e., a composition (A) layer was obtained. Then, a non-woven fabric (sheet-like substrate) cut into the A4 size was soaked into the resin solution, and after squeezing the fabric so that unnecessary resin solution was removed, the fabric was dried at 100° C. for 3 minutes by using a drier. As a result the composition (A) layers were formed on both sides of the non-woven fabric. The alkaline-water-soluble resin and the water-swelling resin were made to adhere the non-woven fabric so that their adhesion amounts were 80 g/m$^2$ and 64 g/m$^2$, respectively. The non-woven fabric had a tensile strength of 0.8 kgf/2.5 cm.

Subsequently, the non-woven fabric on which the composition (A) layer was formed, that is, a covering member in accordance with the present invention, was sewn so that a 80 mm (width)×140 mm (height) bag-shaped member was formed. Then, a 70 mm (width)×150 mm (height)×0.8 mm (thickness) steel panel (produced by JAPAN TEST PANEL OSAKA) as a support body (buried reinforcement) was inserted into the bag-shaped member.

On the other hand, water, cement, clay, and bentonite were mixed at a ratio by weight of 25:12:16:0.6, whereby soil cement milk (hydraulic composition) was prepared. Then, the foregoing bag-shaped member was buried in the soil cement milk. In other words, the steel panel covered with the covering member was driven into the soil cement milk, and thereafter the soil cement milk was let to harden.

3 days after the driving of the steel panel, the steel panel was extracted from the hardened soil cement milk, by using a tensile tester. A drawing load in the work of extraction was 0.8 kgf, which means that the steel panel was extracted from the hardened soil cement milk with great ease.

EXAMPLE 9

The 12.5 wt % methyl alcohol solution of the alkaline-water-soluble resin and the water-swelling resin, which we re respectively prepared in a manner described in the description of Example 8, were mixed at a ratio by dry-state w eight of 10:3.3, whereby a resin solution (dispersed mixture solution) to be formed into a resin layer, i.e., a composition (A) layer was obtained. Then, by conducting identical operation as those of Example 8, the composition (A) layers were formed on both sides of a non-woven fabric. The alkaline-water-soluble resin and the water-swelling resin were made to adhere to the non-woven fabric so that their adhesion amounts were 40 g/$m^2$ and 104 g/$m^2{}_1$ respectively.

Subsequently, by performing operations identical to those of Example 8, the steel panel covered with the bag-shaped covering member was driven into the soil cement milk, and thereafter the steel panel was extracted from the hardened soil cement milk. A drawing load in the work of extraction was 0.6 kgf, which means that the steel panel was extracted from the hardened soil cement milk with great ease.

EXAMPLE 10

A water-swelling resin (water-absorbent material) was prepared by cross-linking-copolymerizing methoxypolyethylene glycol methacrylate and sodium methacrylate under predetermined conditions. The water-swelling resin obtained had a mean particle diameter of 200 μm.

Next, 12.5 wt % methyl alcohol solution of the alkaline-water-soluble resin prepared in a manner described in the description of Example 8 was uniformly sprayed over one surface (one side) of a fabric cut to the A4 size, so that 1.25 g (solids content) of the alkaline-water-soluble resin (alkaline-water-soluble binder) adhered thereto. Then, before the 12.5 wt % methyl alcohol solution of alkaline-water-soluble resin dried up, 1.25 g of the water-swelling resin was uniformly sprinkled thereon, and further, the 12.5 wt % methyl alcohol solution of alkaline-water-soluble resin was uniformly sprayed over the same so that 1.25 g of the alkaline-water-soluble resin was further made to adhere thereto. This allowed a resin layer, i.e., a composition (A) layer, in which the water-swelling resin was homogeneously dispersed in the alkaline-water-soluble resin to be form ed on the surface of the fabric. Then, the alkaline-water-soluble resin and the water-swelling resin were also made to adhere to the other surface of the fabric through the same operations as described above. The fabric was a polyester-cotton blended yarn fabric with a thickness of 0.5 mm, and a basic weight of 200 g/$m^2$, in which polyester and cotton were blended at a ratio by weight of 50:50. Then, the fabric was dried at 100° C. for 3 minutes by using a drier. As a result, the alkaline-water-soluble resin and the water-swelling resin were made to adhere to the fabric so that their adhesion amounts were 80 g/$m^2$ and 40 g/$m^2$, respectively.

Thereafter, by performing operations identical to those of Example 8, the steel panel covered with the bag-shaped covering member was driven into the soil cement milk, and the steel panel was extracted from the hardened soil cement milk. A drawing load in the work of extraction was 1.0 kgf, which means that the steel panel was extracted from the hardened soil cement milk with ease.

EXAMPLE 11

12.5 wt % methyl alcohol solution of the alkaline-water-soluble resin as prepared in Example 8 was uniformly sprayed over one surface (one side) of a fabric cut to the A4 size, so that 1.25 g (solids content) of the alkaline-water-soluble resin was made to adhere thereto. Then, before the 12.5 wt % methyl alcohol solution of alkaline-water-soluble resin dried up, 2.5 g of the water-swelling resin which was prepared in the manner described in the description of Example 9 was uniformly sprinkled thereon, and further, the 12.5 wt % methyl alcohol solution of alkaline-water-soluble resin was uniformly sprayed over the same so, that 1.25 g of the alkaline-water-soluble resin was further made to adhere thereto. This allowed a resin layer, i.e., a composition (A) layer, in which the water-swelling resin was homogeneously dispersed in the alkaline-water-soluble resin to be formed on the surface of the fabric. The fabric was a blended yarn fabric identical to that used in Example 9. Then, the fabric was dried at 100° C. for 3 minutes by using a drier. In other words, the composition (A) layer was formed on a surface on one side of the fabric. The alkaline-water-soluble resin and the water-swelling resin were made to adhere to the fabric so that their adhesion amounts were 40 g/$m^2$ and 40 g/$m^2$, respectively.

Subsequently, the fabric on which the composition (A) layer was formed, that is, the covering member in accordance with the present invention, was sewn so that a 80 mm (width)×140 mm (height) bag-shaped member was formed with the composition (A) layer coming outside.

Thereafter, by performing operations identical to those of Example 8, the steel panel covered with the bag-shaped covering member was driven into the soil cement milk, and the steel panel was extracted from the hardened soil cement milk. A drawing load in the work of extraction was 0.5 kgf, which means that the steel panel was extracted from the hardened soil cement milk with great ease.

EXAMPLE 12

A water-swelling resin (water-absorbent material) was prepared by cross-linking-copolymerizing sodium acrylate and acrylic acid under predetermined conditions. The water-swelling resin obtained had a mean particle diameter of 100 μm.

Next, 12.5 wt % methyl alcohol solution of the alkaline-water-soluble resin prepared in the manner described in the description of Example 8 was uniformly sprayed over one surface (one side) of a fabric cut to the A4 size, so that 1.25 g (solids content) of the alkaline-water-soluble resin was made to adhere thereto. Then, before the 12.5 wt % methyl alcohol solution of alkaline-water-soluble resin dried up, 5.0 g of the water-swelling resin was uniformly sprinkled thereover, and the 12.5 wt % methyl alcohol solution of the alkaline-water-soluble resin was uniformly sprayed thereover so that 1.25 g (solids content) of the alkaline-water-soluble resin was further made to adhere thereto. This allowed a resin layer, i.e., a composition (A) layer, in which the water-swelling resin was homogeneously dispersed in the alkaline-water-soluble resin to be formed on the surface of the fabric. The fabric was a blended yarn fabric identical to that used in Example 9. Then, the fabric was dried at 100° C. for 3 minutes by using a drier. In other words, the composition (A) layer was formed on a surface on one side of the fabric. The alkaline-water-soluble resin and the water-swelling resin were made to adhere to the fabric so that their adhesion amounts were 40 g/$m^2$ and 80 g/$m^2$, respectively. The tensile strength of the fabric was 31 kgf/2.5cm.

Subsequently, the foregoing fabric on which the composition (A) layer was formed, that is, the covering member of the present invention was sewn so that a 80 mm (width)×140 mm (height) bag-shaped member was formed with the composition (A) layer coming outside.

Thereafter, by performing operations identical to those of Example 8, the steel panel covered with the bag-shaped covering member was driven into the soil cement milk, and the steel panel was extracted from the hardened soil cement milk. A drawing load in the work of extraction was 0.6 kgf, which means that the steel panel was extracted from the hardened soil cement milk with great ease.

EXAMPLE 13

12.5 wt % methyl alcohol solution of the alkaline-water-soluble resin and a water-swelling resin, prepared as described in the description of Example 8, were mixed at a ratio by weight of 10:2.5, whereby a resin solution was obtained. The resin solution was applied on both surfaces of a 70 mm (width)×150 mm (height)×0.8 mm (thickness) steel panel, and was dried at room temperature for 30 minutes, and was further dried at 60° C. for 30 minutes by using a drier. The alkaline-water-soluble resin and the water-swelling resin were made to adhere to the steel panel so that their adhesion amounts were 100 g/$m^2$ and 100 g/$m^2$, respectively.

Subsequently, soil cement milk was prepared by conducting the same operations as these of Example 8, and the foregoing steel panel was buried in the soil cement milk placed in a container. In other words, the steel panel which was not covered with a bag-shaped covering member was driven into the soil cement milk, and thereafter the soil cement milk was let to harden.

7 days after the steel panel was driven into the soil cement milk, the steel panel was extracted from the hardened body of the soil cement milk. A drawing load in the work of extraction was 6.0 kgf. Comparing this result with that in the case where a non-woven fabric (sheet-like substrate) was used, the steel panel was not extracted with so great ease as that in the case of the non-woven fabric, but comparing the foregoing result with that in the case of the steel panel alone, the steel panel was extracted with greater ease.

Comparative Example 1

A comparative covering member was produced by using synthetic rubber-based adhesive (produced by Sumitomo 3M Ltd., trade name: "3M SUPUREI NORI 99 (3M SPRAY BOND 99)"), instead of an alkaline-water-soluble resin. The adhesive synthetic rubber included, as components, 10 wt % of a synthetic rubber such as styrene butadiene rubber, 40 wt % of an organic solvent: such as n-pentane, acetone, or toluene, and 50 wt % of gas (for spraying) such as LPG, or dimethylether.

First, the foregoing adhesive was uniformly sprayed over one surface (one side) of an non-woven fabric cut to the A4 size, so that 0.5 g (solids content) of the synthetic rubber was made to adhere thereto. Then, 2.5 g of the water-swelling resin, prepared in the manner described in the description of Example 8, was uniformly sprinkled thereon, and further, the adhesive was uniformly sprayed thereover so that 1.5 g of the synthetic rubber was further made to adhere thereto. This allowed the water-swelling resin to adhere to the surface of the fabric. Then, the synthetic rubber and the water-swelling resin were also made to adhere to the other surface of the fabric through the same operations as described above. Then, the fabric was dried at 100° C. for 5 minutes by using a drier. As a result, the synthetic rubber and the water-swelling resin were made to adhere to the fabric at a ratio of 64 g/$m^2$ and 80 g/$m^2$, respectively.

Thereafter, by performing operations identical to those of Example 8, the steel panel covered with the bag-shaped covering member for comparison use was driven into the soil cement milk, and the steel panel was extracted from the hardened soil cement milk. A drawing load in the work of extraction was 3.0 kgf, which means that the steel panel was extracted from the hardened soil cement milk with difficulty.

Comparative Example 2

40 wt % monomer solution was prepared by dissolving 0.12 mole % (with respect to sodium acrylate monomer) of N,N'-methylene-bisacrylamide and 1.0 g per mole (with respect to sodium acrylate monomer) of sodium persulfate into a sodium acrylate solution with a neutralization ratio of 75% (neutralizer: sodium hydrate).

Polypropylene/polyethylene non-woven fabric whose moisturized-state tensile strength was 0.9 kgf/25 mm was soaked in the foregoing monomer solution so that the fabric was impregnated with the solution, and an unnecessary portion of the monomer solution was squeezed out by a roller. The impregnation was heated so that radical polymerization occurred, and an adhesion preventing member for comparison use in which 60 g/$m^2$ of an water-swelling resin directly adhered to the substrate without adhesive was obtained.

Next, the comparative adhesion preventing member was sewn, so that a 350 mm (width) (circumference of opening: 700 mm)×1200 mm (height) bag-shaped member for comparison use with a maximum drawing strength of 0.010 kgf/$cm^2$ was formed.

Subsequently, a 100 mm (width)×100 mm×1 m (length) H-shaped steel was covered with the comparative bag-shaped adhesion preventing member, by inserting the H-shaped steel into the bag-shaped adhesion preventing member. Here, the comparative bag-shaped adhesion preventing member was caught by a sharp corner of the H-shaped steel, whereby the caught portion became torn easily.

On the other hand, soil cement milk (hydraulic composition) was prepared by mixing water, cement, clay, and bentonite at a ratio by weight of 755:175:488:18.

Subsequently, after placing the soil cement milk into a 1-meter-deep container, the H-shaped steel covered with the foregoing partly torn comparative bag-shaped adhesion preventing member was driven into the soil cement milk.

7 days after the H-shaped steel was driven into the soil cement milk, the H-shaped steel was extracted from the hardened body of the soil cement milk with use of a tensile tester. A drawing load in the work of extraction was as great as 127 kgf, which means that the H-shaped steel was extracted from the hardered soil cement milk with difficulty.

Referential Example 1

12.5 wt % methyl alcohol solution of the alkaline-water-soluble resin prepared in the manner described in the description of Example 8 was uniformly sprayed over one surface (one side) of a fabric cut to the A4 size, so that 2.5 g (solids content) of the alkaline-water-soluble resin was made to adhere thereto. The fabric was a polyester-cotton blended yarn fabric with a thickness of 0.5 mm, and a basic weight of 200 g/m$^2$, in which polyester and cotton were blended at a ratio by weight of 50:50. Then, the fabric was dried at 100° C. for 3 minutes by using a drier. In other words, an alkaline-water-soluble resin was formed on one surface of the fabric. As a result, the alkaline-water-soluble resin was made to adhere so that its adhesion amount was 80 g/m$^2$.

Subsequently, the foregoing fabric on which the alkaline-water-soluble resin layer was formed, that is, the foregoing covering member, was sewn so that a 80 mm (width)×140 mm (height) bag-shaped member was formed with the alkaline-water-soluble resin layer coming outside.

Thereafter, by performing operations identical to those of Example 8, the steel panel covered with the bag-shaped covering member was driven into the soil cement milk, and the steel panel was extracted from the hardened soil cement milk. A drawing load in the work of extraction was 1.5 kgf, which means that the steel panel was extracted from the hardened soil cement milk with ease.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An adhesion preventing method for preventing adhesion of a hardened body of a hydraulic composition and a support body, the support body being intended to support the hardened body of the hydraulic composition from the inside or outside the same at least while the hydraulic composition is being hardened, said method comprising the step of:

providing a composition (A) layer so as to intervene between the support body and the hardened body of the hydraulic composition, the composition (A) layer being made of a composition (A) which is composed of at least an alkaline-water-soluble resin with an acid value of not less than 15 mgKOH/g and not more than 500 mgKOH/g, and a water-absorbent material.

2. The adhesion preventing method as set forth in claim 1, wherein said provision of the composition (A) layer is carried out by making the composition (A) to adhere directly to the support body.

3. The adhesion preventing method as set forth in claim 2, wherein an amount per unit area of the composition (A) adhering to the support body is in a range of 20 g/m$^2$ to 1000 g/m$^2$.

4. The adhesion preventing method as set forth in claim 2, wherein a ratio of loss of the composition (A) from the support body is not more than 50%.

5. The adhesion preventing method as set forth in claim 2, wherein said water-absorbent material is a water-swelling resin.

6. The adhesion preventing method as set forth in claim 1, wherein said provision of the composition (A) layer is carried out by covering the support body with a sheet-like member on which the composition (A) adheres.

7. The adhesion preventing method as set forth in claim 6, wherein the sheet-like member is formed in a bag shape or a tube shape.

8. The adhesion preventing method as set forth in claim 6, wherein an amount per unit area of the composition (A) adhering to the sheet-like member is in a range of 20 g/m$^2$ to 1000 g/m$^2$.

9. The adhesion preventing method as set forth in claim 6, wherein a ratio of loss of the composition (A) from the sheet-like member was not more than 50%.

10. The adhesion preventing method as set forth in claim 6, wherein said water-absorbent material is a water-swelling resin.

11. The adhesion preventing method as set forth in claim 1, further comprising the step of forming a waterproof coat on a surface of the composition (A) layer.

12. A support body, wherein a composition (A) composed of an alkaline-water-soluble resin with an acid value of not less than 15 mgKOH/g and not more than 500 mgKOH/g, and a water-absorbent material is applied to at least a part of said support body.

13. The support body as set forth in claim 12, wherein an amount of the composition (A) applied per unit area is in a range of 20 g/m$^2$ to 1000 g/m$^2$.

14. The support body as set forth in claim 12, wherein a ratio of loss of said composition (A) is not more than 50%.

15. The support body as set forth in claim 12, wherein said water-absorbent material is a water-swelling resin.

16. A sheet-like member, wherein a composition (A) composed of an alkaline-water-soluble resin with an acid value of not less than 15 mgKOH/g and not more than 500 mgKOH/g, and a water-absorbent material is applied to at least a part of said sheet-like member.

17. The sheet-like member as set forth in claim 16, wherein an amount of said composition (A) applied per unit area is in a range of 20 g/m$^2$ to 1000 g/m$^2$.

18. The sheet-like member as set forth in claim 16, wherein a ratio of loss of said composition (A) is not more than 50%.

19. The sheet-like member as set forth in claim 16, wherein said water-absorbent material is a water-swelling resin.

20. A support body extracting method for extracting a support body out of a cement composition after the cement composition is hardened, the support body being intended to support the hardened body of the cement composition from inside the same at least while the cement composition is being hardened, the cement composition being used for soil structure which is built in foundation constructing works in the civil engineering and construction fields, said method comprising the steps of:

pouring the cement composition into a bore hole formed by boring the soil;

preparing the support body by making a composition (A) composed of at least an alkaline-water-soluble resin with an acid value of not less than 15 mgKOH/g and not more than 500 mgKOH/g, and a water-absorbent resin to adhere to a surface of the support body, or by covering the support body with a sheet-like member on which the composition (A) adheres;

providing a layer of the composition (A) so as to intervene between the support body and the hardened body of the cement composition, by driving the support body prepared through said support body preparing step into the cement composition placed in the bore hole and letting the cement composition harden; and extracting the support body from the hardened body of the cement composition.

21. The support body extracting method as set forth in claim 20, wherein an amount of the composition (A) per unit area, made to adhere to the support body or the sheet-like member so as to intervene between the support body and the hardened body of the cement composition, is in a range of 20 $g/m^2$ to 1000 $g/m^2$.

22. The support body extracting method as set forth in claim 20, wherein a ratio of loss of the composition (A) is not more than 50 percent.

23. The support body extracting method as set forth in claim 20, wherein the water-absorbent material is a water-swelling resin.

* * * * *

UNITED STATES PATENT AND TRADEMARK OFFICE
CERTIFICATE OF CORRECTION

PATENT NO. : 6,280,120 B1 
DATED : August 28, 2001
INVENTOR(S) : Kouichi Okamoto, Yoshihiko Masuda, Kenji Kadonga, Yohei Murakami and Akira Hattori It is certified that error appears in the above-identified patent and that said Letters Patent is hereby corrected as shown below:

Title page,
Item [30], Foreign Application Priority Data, kindly replace: "10-211240" with -- 10-211420 --

Item [56], References Cited, FOREIGN PATENT DOCUMENTS, on the line below "64-58715 3/1989 (JP)," insert -- 4-16618 1/1992 (JP) --

Signed and Sealed this

Twenty-fifth Day of June, 2002

*Attest:*

JAMES E. ROGAN

*Attesting Officer* *Director of the United States Patent and Trademark Office*